United States Patent [19]
Morgan et al.

[11] Patent Number: 5,799,286
[45] Date of Patent: Aug. 25, 1998

[54] AUTOMATED ACTIVITY-BASED MANAGEMENT SYSTEM

[75] Inventors: James Joseph Morgan; Terry Lee Johnson; Leah Ellen Keefer; Patricia Ann Smith; William Howell Bradford; Kathryn Louise Wells; Eric Todd Mason, all of Plano, Tex.

[73] Assignee: Electronic Data Systems Corporation, Plano, Tex.

[21] Appl. No.: 488,003

[22] Filed: Jun. 7, 1995

[51] Int. Cl.$^6$ .................................................. G46F 17/60
[52] U.S. Cl. .................................. 705/30; 705/7; 705/8
[58] Field of Search ................................. 364/401 R, 402, 364/406, 464.01, 235, 377; 395/207, 208, 209, 230, 232; 705/7, 8, 9, 30, 32

[56] References Cited

PUBLICATIONS

Gammell, Frances, McNair, C.J., "Jumping the growth threshold through activity–based cost management," Managment Accounting, V.76N3, pp. 37–46, Sep. 1994.

Parker, Kevin, "Evolution continuew in MRP II–type Systems," Manufacturing Systems, V12N7, pp. 32–54, Jul. 1994.

Helberg, C., Galletly, J.E., Bicheno, J.R., "Simulating activity–based costing," Industrial Management and Data Systems, V94N9, p. 3–8, 1994.

Barth, Claire, "Office Technology," Management Accounting, V76N3, pp. 72–73, Sep. 1994.

Anonymous, "Software for ABC," Management Accounting, V75N10, pp. 62–64, Apr. 1994.

Barth, Claire, "Activity Analyzer," Management Accounting, V75N10, pp. 68–69, Apr. 1994.

Schwan, Edward S., "Activity–based costing: Something old, something new," Mid-Atlantic Journal of Business, V30N3, pp. 295–298, Dec. 1994.

Cooper, Robin, Kaplan, Robert S., "Activity–Based Systems: Measruing the Costs of Resource Usage," Accounting Horizons, V6N3, pp. 1–13, Sep. 1992.

Arney, Dave, Sorice, Ralph P., "Activity–based costing," A Proactive Management Tool, Credit World, pp. 17–19, Jul./Aug. 1994.

Mathews, Ryan, "ABC Made Easy," Progressive Grocer, pp. 37–40, Sep. 1994.

*Primary Examiner*—Robert A. Weinhardt
*Assistant Examiner*—Phillip Graff
*Attorney, Agent, or Firm*—Wei Wei Jeang; L. Joy Griebenow

[57] ABSTRACT

An automated activity-based management system and method (10) for making thereof are provided. A business organization has costs associated with its employees, facilities, equipment, and overhead to produce products or provide services. Such a business organization typically generates traditional general ledger accounting information (152) and human resources information (150). This traditional accounting information (150, 152, 154) is used along with information directed to activities, equipment usage and facilities utilization to generate costs associated with activities performed by the organization. A computer workstation (40) with a graphical user interface (42) is used to accept entries of activity information (74). The activity information and traditional accounting information are fed to a relational database (12). The information is processed and costs associated with the employee, facilities, equipment, and overhead components (20, 22, 24, 26) of activities are computed. User-definable ad-hoc reports as well as preformated reports for trending, forecasting, comparison, benchmarking, and budgeting purposes are generated.

74 Claims, 10 Drawing Sheets

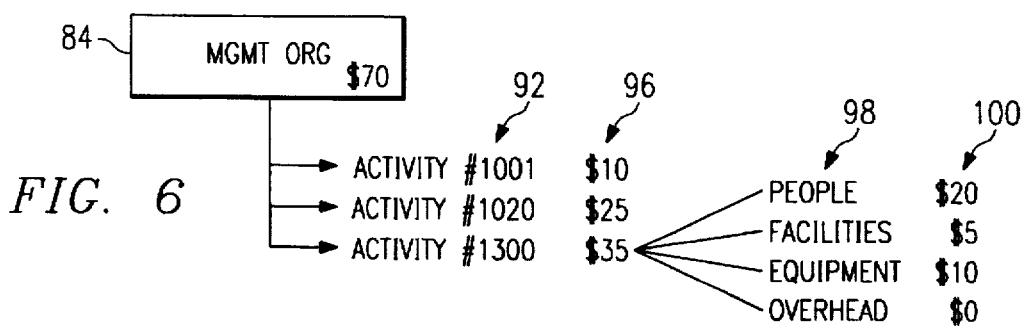
FIG. 6
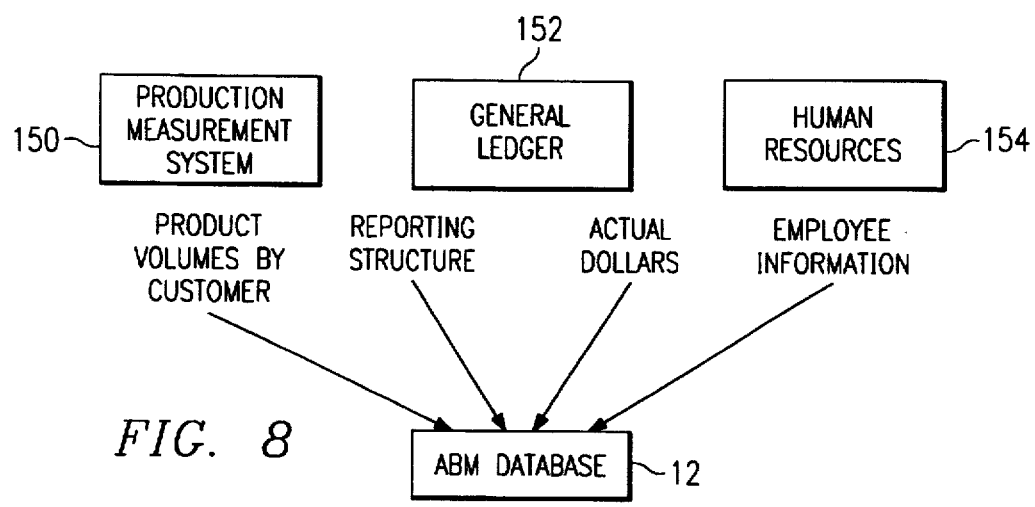
FIG. 8
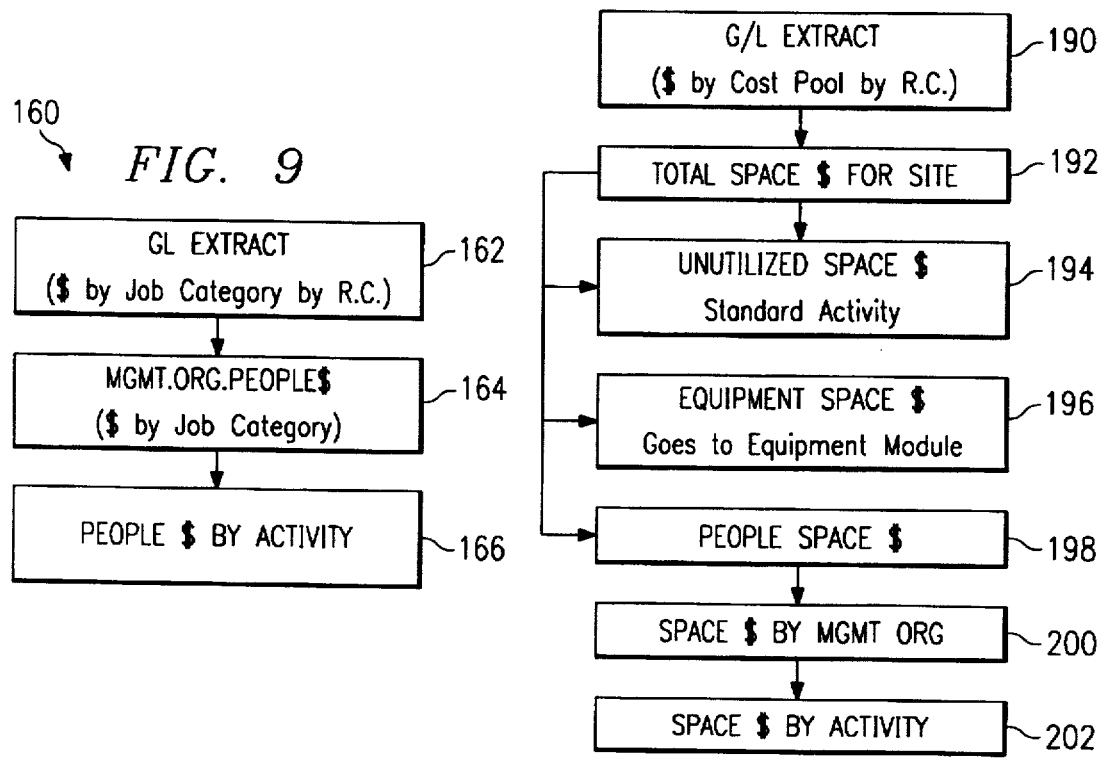
FIG. 9
FIG. 11

1

AUTOMATED ACTIVITY-BASED MANAGEMENT SYSTEM

TECHNICAL FIELD OF THE INVENTION

This invention is related in general to the field of business accounting systems. More particularly, the invention is related to an automated activity-based management system.

BACKGROUND OF THE INVENTION

Conventional costing and management decision support systems use traditional profit and loss statements to analyze costs such as salaries, equipment, facilities, and administrative expenses. Based on these figures, business managers use direct material and labor consumption as the primary means of determining product costs and sale prices, and apportioning overhead costs. This method has been adequate when the overhead and administrative cost of activities not directly related to production was small compared with the direct material and labor required to manufacture the end product. However, in today's service businesses and manufacturing environments, automation has substantially reduced the amount of direct material and labor consumption, so that indirect activities have become a significant factor contributing to the cost of making the product. The result gives business managers a skewed view of how the business organization spends money, which may cause them to make pricing errors, mis-allocate resources, and make strategic mistakes.

A more reliable and useful way of viewing an organization's operations is to associate costs with activities. Activity-based costing or "ABC" is a method advocated by Peter B. B. Turney in *Common Cents: The ABC Performance Breakthrough* published by Cost Technology of Hillsboro, Oreg., and is incorporated herein by reference. Activity-based costing measures the cost and performance of activities and products. In product costing applications, for example, activity-based costing allows costs to be apportioned to products by the activities and resources consumed in procuring parts or materials, manufacturing, marketing, selling, delivering, and servicing the product. With activity-based costing information, managers are provided a true gauge of the business operations, and can make better strategic business and management decisions.

Some activity-based costing software packages are commercially available. Examples include Netprophet II by Sapling Inc. of Fort Lee, N.J.; Easy ABC Plus by ABC Technologies of Beaverton, Oreg.; ICMS by ICMS, Inc. of Arlington, Tex.; Hyper ABC by Armstrong Laing Inc. of Atlanta, Ga.; AIO WIN by Knowledge Based Systems of College Station, Tex.; and Dekker Trakker by Dekker, Ltd. of San Bernadino, Calif. These software packages are generally static point-in-time systems which do not provide continuous, dynamic, and real-time costing information. Several of these systems may also require labor-intensive manual input of general ledger information, and none provide forecasting, ad-hoc reporting, and trend analysis capabilities. In general, these software packages are not robust and are not designed for large corporation applications.

SUMMARY OF THE INVENTION

Accordingly, there is a need for an automated activity-based management system (ABM) that provides continuous, dynamic, and real-time cost information and reports.

In accordance with the present invention, an automated activity-based management system is provided which eliminates or substantially reduces the disadvantages associated with prior traditional or activity-based costing systems.

In one aspect of the invention, an automated activity-based management system and method for making the same are provided. The business organization has costs associated with its people, facilities, and equipment to produce products or provide services. Such a business organization typically generates traditional general ledger accounting information and human resources information. This traditional accounting information is used along with information directed to activities, equipment usage and facilities utilization to generate costs associated with activities performed by an organization. A computer workstation with a graphical user interface is used to accept entries of activity information. The activity information and traditional accounting information are fed to a relational database. The information is processed and costs associated with the employee, facilities, equipment, and overhead components of activities are computed. User-definable ad-hoc reports as well as preformatted reports for trending, forecasting, comparison, benchmarking, and budgeting purposes are available.

In another aspect of the invention, an automated activity-based management system for a business organization occupying facilities, employing people and using equipment to produce products and provide services is provided. The system includes a relational database which receives traditional accounting information and accepts information related to activities provided by the users. The activity information includes the activities performed, the percentage of time each activity is performed, equipment utilization data, and space utilization data. Further included is a people module for processing the traditional accounting information and activity information to generate a people cost component associated with each activity. A facilities module processes the traditional accounting information and activity information and generates a facilities cost component associated with each activity. An equipment module processes the traditional accounting information and activity information and generates an equipment cost component associated with each activity. An overhead module is also provided to process the traditional accounting information and activity information to generate an overhead cost component associated with each activity. A reporting module generates cost summaries of the activities.

In yet another aspect of the invention, an automated activity-based method for managing a business organization is provided. The traditional accounting information normally generated in the business organization is downloaded to a relational database, and activity information including activities performed by employees, the percentage of time employees spend on performing each activity, equipment utilization rates, and facility utilization are provided to the relational database either in the form of user inputs or automated download if the information is already electronically stored and available. Thereafter, a people cost component, a facilities cost component, an equipment cost component, and an overhead cost component associated with each activity are computed. Based on the activity costs and the output resulting from the activities, the value of activities performed by an organization can be accurately determined. According to the activity costs, the activities can be prioritized to emphasize valuable activities and de-emphasize or eliminate wasteful or unnecessary activities. Resources such as facilities and equipment can also be better utilized.

BRIEF DESCRIPTION OF THE DRAWINGS

For a better understanding of the present invention, reference may be made to the accompanying drawings, in which:

FIG. 6 is a simplified block diagram illustrating an example of the calculation of monetary costs for components of the activities;

FIG. 8 is a block diagram of exemplary automated inputs;

FIG. 9 is an exemplary block diagram overview of the people component of activities;

FIG. 11 is an exemplary block diagram overview of the facilities component of activities;

DETAILED DESCRIPTION OF THE INVENTION

Figure 1:
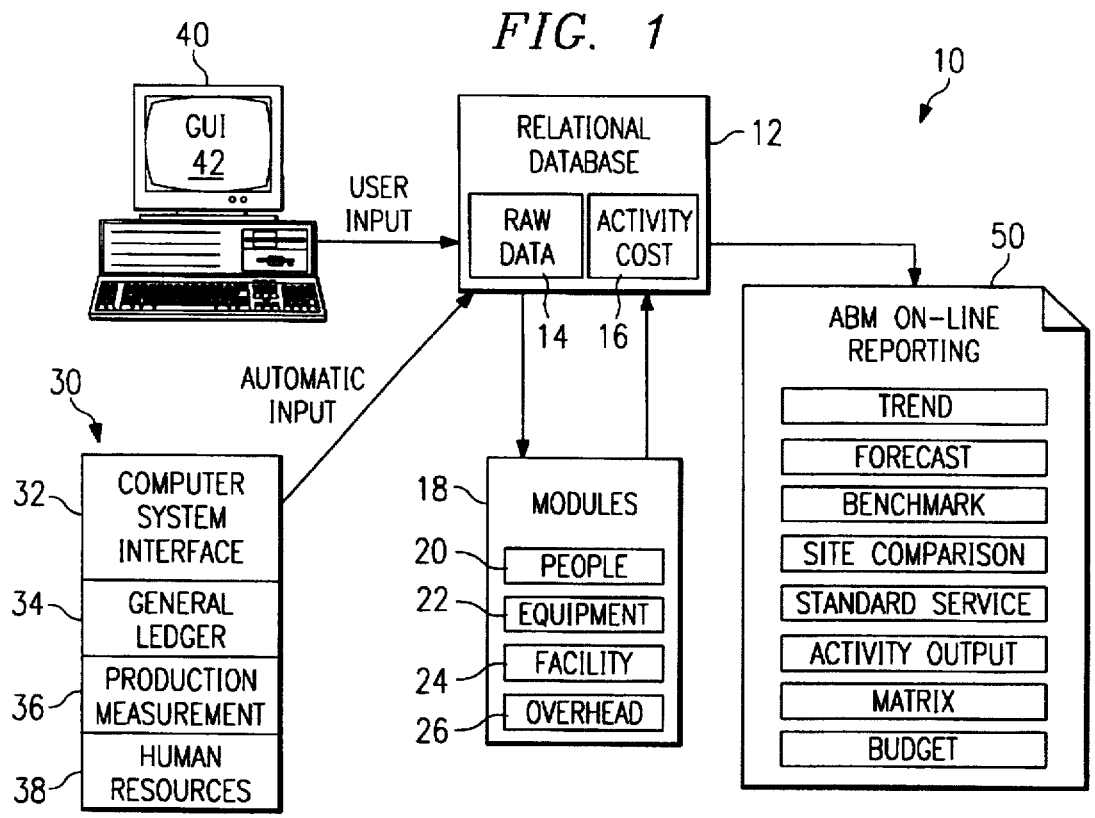
FIG. 1 is a block diagram of an overview of the automated activity-based management system.

Referring to FIG. 1, a simplified top level block diagram providing an overview of the automated activity-based management system 10 is shown. The system 10 is best suited for use by a business organization which employs people and uses equipment to provide services or produce products. At the heart of the system 10 is a relational database 12 with organized data structures containing raw business data 14 and processed activity cost information 16. Having access to the relational database 12 are data processing modules 18, including, for example, a people module 20, an equipment module 22, a facility module 24, and an overhead module 26 to process and determine the costs applicable to the activities performed in the organization. These data processing modules 18 are described in detail below.

There are at least two data input sources to the relational database 12, including automated system inputs from an existing computer system or mainframe 30 through an interface 32. The data automatically imported or downloaded from the existing computer 30 may include general ledger (GL) data 34, production measurement system data 36, and human resources system data 38. This accounting data may reside on a data storage device in the form of a database.

Another data source to the relational database 12 is user input on a workstation 40 through a graphical user interface (GUI) 42. The type of information entered by the user in this manner may include, for example, an identification of employees in specific management organizations, employee activity information, equipment and space utilization information, and product information. Details of the automated system input and the user input are set forth below.

The automated activity-based management system 10 also includes an on-line reporting feature 50, which may generate predefined or user-defined reports on a periodic basis or on demand. Examples of the many types of reports available may include trend, forecast, benchmark, site comparison, standard service, activity output, matrix, quality, and value-added reports.

Traditionally, a business organization generates and maintains the general ledger data 34, production measurement system data 36, and human resources system data 38, and business decisions and strategies are generally made based on these data. The automated activity-based management system 10 of the present invention takes this traditional accounting information, along with some additional business information provided by the user, and allocates the monetary cost or dollars to the activities performed. For example, the traditional general ledger view of a computer network operation business unit maps the money spent to salaries, hardware, software, maintenance, and space. The activity-based management view maps these same expenditures to activities such as network surveillance, network testing, technical assistance, problem resolution, vendor interaction, and configuration changes. Activity-based management thus provides a more realistic, operational, and meaningful view of how the money was spent.

Because budgets are typically formulated from general ledger data 34 with the traditional categories of salaries, hardware, software, and space, the activity-based management system 10 is also capable of taking the activity information and producing the traditional costing information. Most employees are uncomfortable and unfamiliar with accounting terms, rules, and principles associated with budgets. However, they are familiar with the activities they perform on a day-to-day basis. When allowed to input information associated with their activities and deriving a budget from this information, the result is more realistic and reliable and the organization is more likely to embrace their budget. Constructed in this manner, the activity-based management system 10 is a flexible tool that not only tracks current operational performance, but also provides the information for forecasts or budgets.

Figure 2:
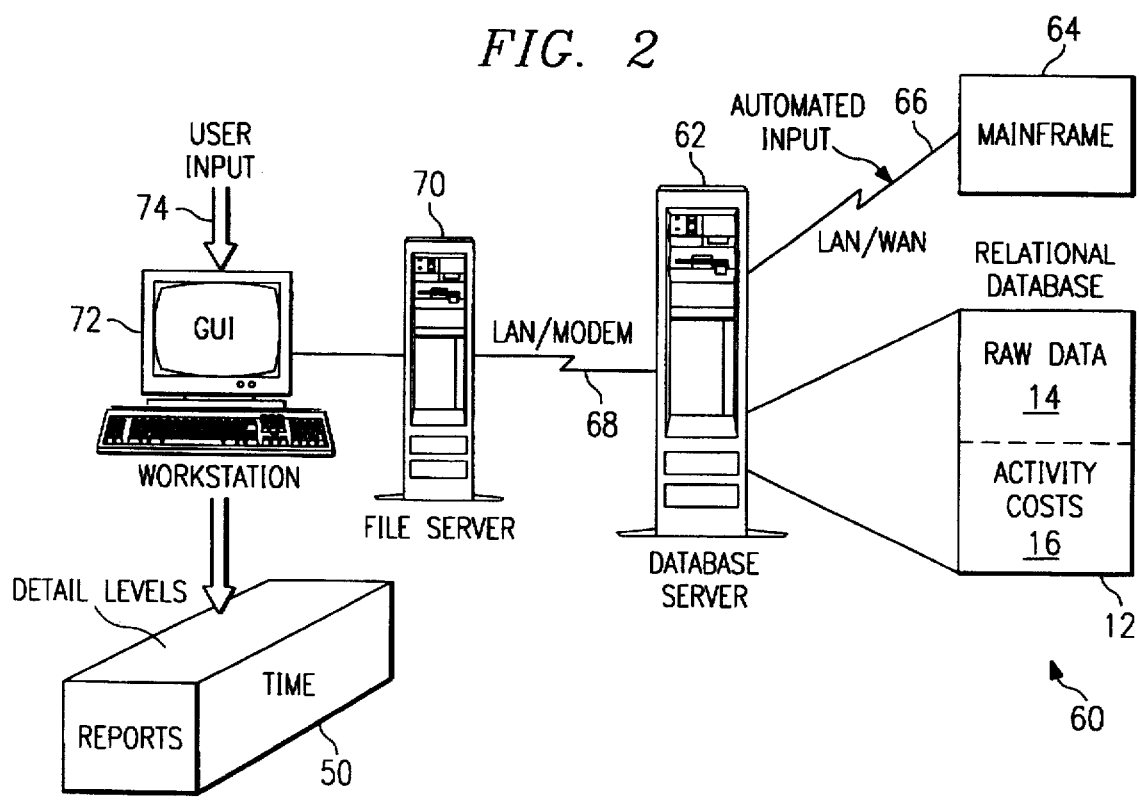
FIG. 2 is a block diagram representing an example of the physical components of the automated activity-based management system.

FIG. 2 is a simplified diagram of the physical components associated with the automated activity-based management system 10. The relational database 12 may be implemented with an Informix database by Informix Software, Inc. of Menlo Park, Calif. The data may be stored on a suitable data storage device 60, such as tapes and disks, and is accessed by a database server 62. A 690MP SPARCserver made by Sun Microsystems of Mountain View, Calif. has been successfully used as the database server 62. The database server 62 is preferably linked to a mainframe computer 64 by a local or wide area network (LAN/WAN) 66 for automated uploading and downloading information therebetween. The database server 62 is further linked by the same or a different local or wide area network or by telecommunications lines through a modem 68 (not shown) to a local file server 68. However, the file server 68 is optional and the workstation 72 may be connected directly to the database server 68 through the LAN/modem 68.

The file server 70 is, in turn, connected to a user workstation 72. The user or systems operator may enter user input information 74 through a graphic user interface application running on the workstation 72. The graphic user interface is also capable of displaying reports having two dimensional aspects: levels of detail along one dimension, and time along the other dimension. For example, a high level manager may be interested in how dollars are allocated to specific activities performed in his/her management organization, but is not interested in which employee performed which of the activities. The reports are customized to provide different levels of granularity or details to cater to the needs of different levels of personnel. Further, security may be incorporated into certain levels of reports or certain data to lock out users who do not have authorized access. In the time dimension, a user may browse historic data and reports as well as forecast or budgets. A graphical user interface application software, such as PowerBuilder made by Powersoft Corporation of Concord, Mass. may be used to configure the graphical user interface for the system 10.

Figure 3:
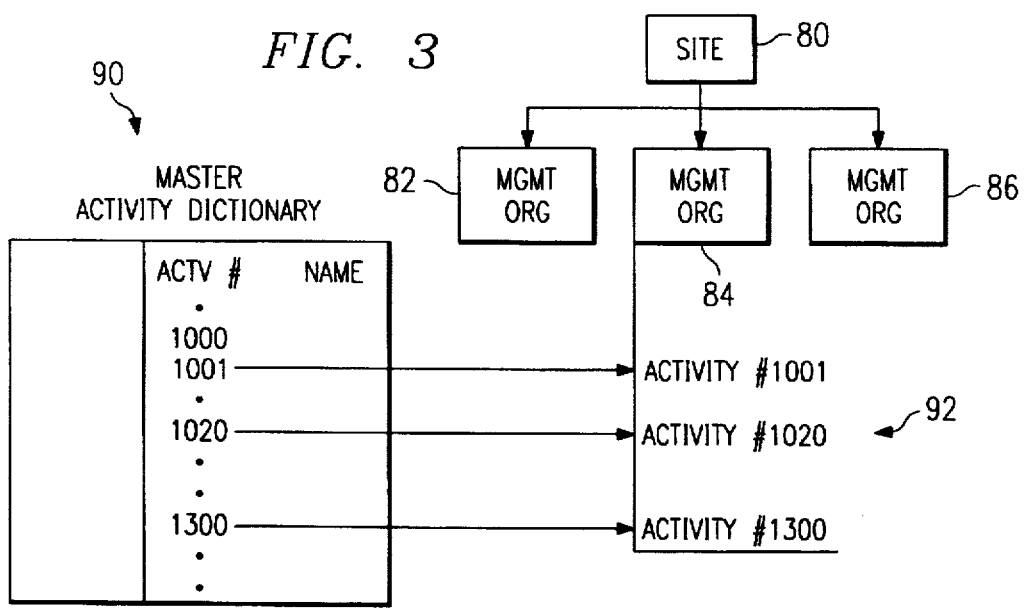
FIG. 3 is a simplified block diagram illustrating examples of steps and functions performed by the automated activity-based management system.
Figure 4:
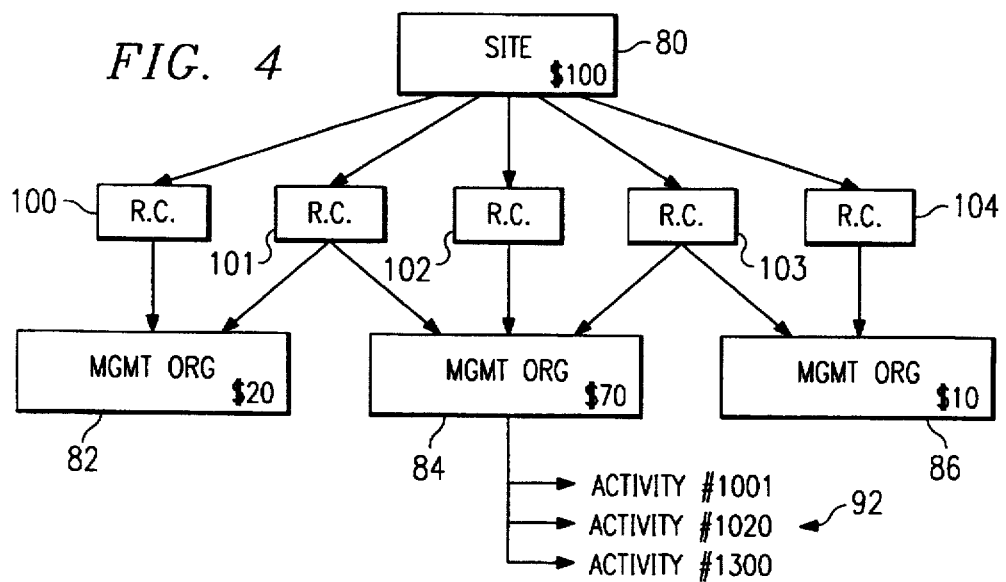
FIG. 4 is another simplified block diagram illustrating exemplary steps and functions performed and relationships between business entities in the automated activity-based management system.
Figure 5:
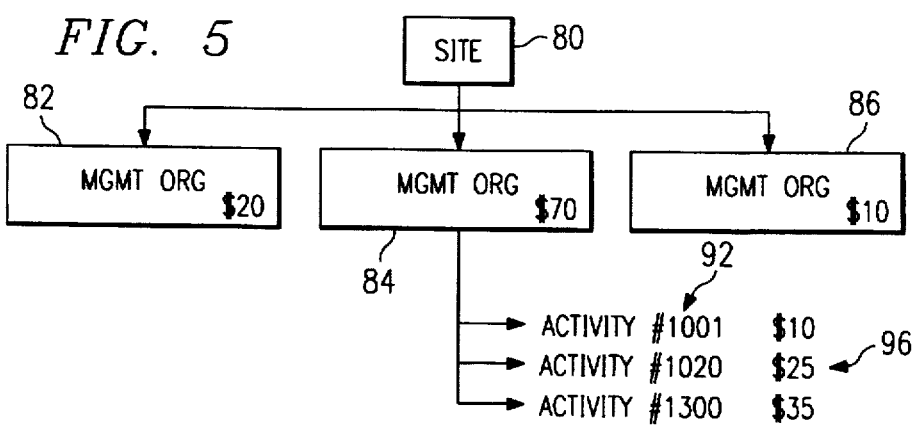
FIG. 5 is a simplified block diagram illustrating an example of the calculation of monetary costs for activities.

FIGS. 3–5 describe the most basic functions performed by the automated activity-based management system 10. Each site 80 of a business organization is divided into a number of business units or management organizations 82–86. A site 80 is not necessarily defined as a physical location, but may be a business unit for which the general ledger accounts have traditionally assigned resources. For example, a site may be the legal department with offices in several facilities or in different cities. Examples of management organizations 82–86 for a legal department/site may include intellectual property, litigation, and mergers and acquisitions. For each management organization 82–86, all the activities 92 performed to achieve business objectives thereof are identified. For the intellectual property management organization, for example, the activities 92 may include soliciting invention disclosures, drafting patent applications, drafting licensing agreements, and inventor education. These activity names or codes are collected in a master activity dictionary 90, which functions as a glossary of activities for all sites 80. Once the master activity dictionary 90 is set up, subsequent activity identification tasks need only select from the dictionary. If a new or unique activity is identified, it is added to the master activity dictionary 90.

FIG. 4 shows that site costs are distributed to management organizations 82–86 according to mapping of responsibility center dollars. The dollars for each site 80 are divided into cost centers or responsibility centers (R.C.) 100–104. A responsibility center 100–104 is a financial grouping of dollars or cost used in the general ledger 34, which may or may not be based on the functionality division of the organization. Therefore, when the dollars in the responsibility centers 100–104 are mapped to the management organizations 82–86, the correspondence may not be one-to-one, as shown in FIG. 4. In this manner, the dollars or resources are allocated to the management organizations 82–86, for which activities have been identified.

Referring to FIG. 5, the cost 96 for each activity 92 performed in a management organization 82–86 is then determined by subdividing the cost of the management organization. As shown in FIG. 6, the total cost attributable to an activity preferably has four components: people, facilities, equipment, and overhead 98. Each of the components 98 has a cost 100 associated therewith. Therefore, an activity's cost represents the sum of the costs of all four components 98.

Figure 7:
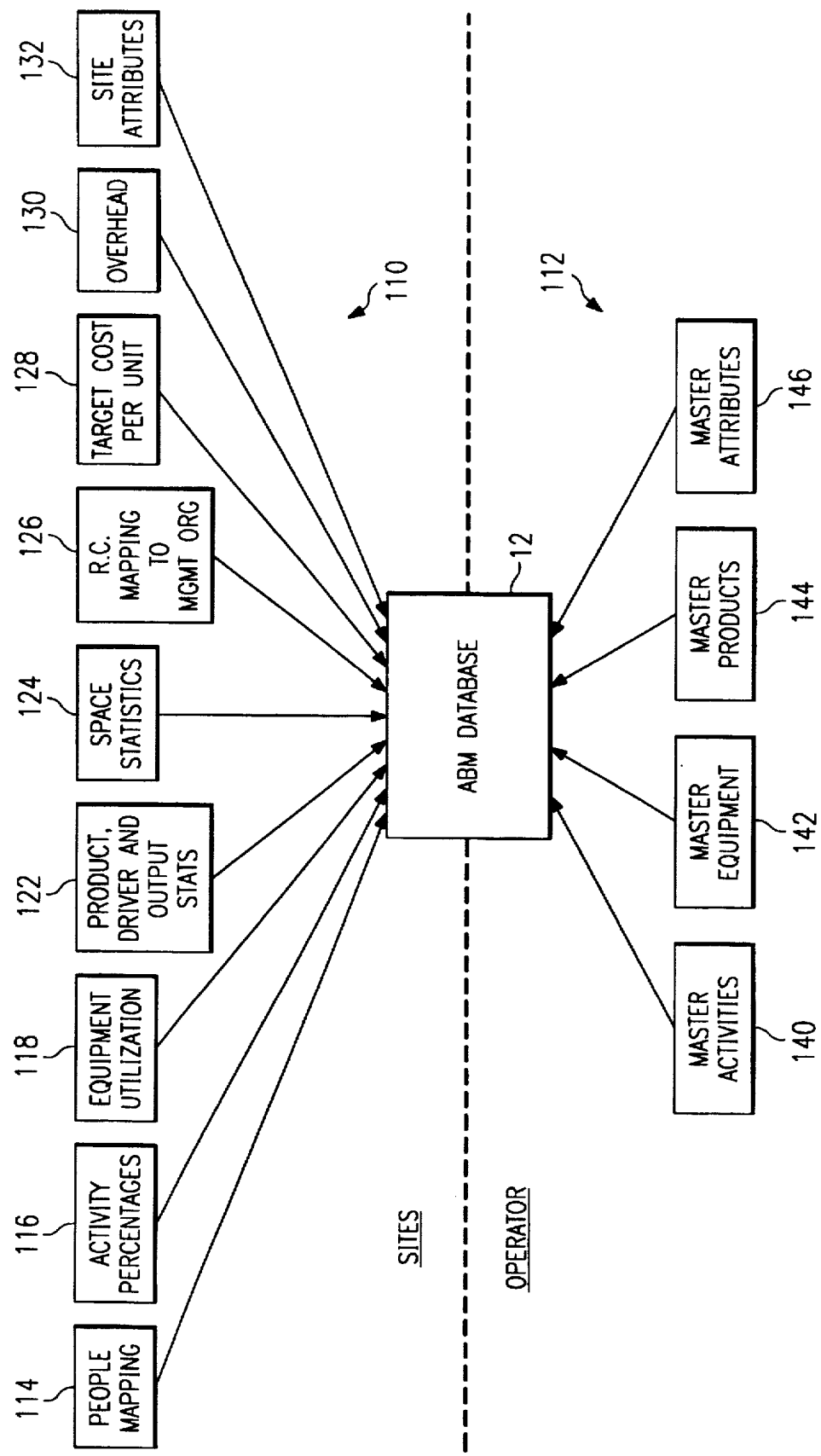
FIG. 7 is a block diagram of exemplary system inputs.

In order to determine the people, facilities, equipment, and overhead costs associated with the activities, as shown in FIGS. 3–6, data input are needed. FIG. 7 provides an exemplary summary of the types of data that are input into the automated activity-based management system database 12. Two broad categories of inputs are possible, those entered by users 110 and those entered and maintained by the system operators 112.

Referring to FIG. 7, a first type of information entered by users is personnel information or people mapping 114. People mapping data entry 114 basically identifies the management organizations at a site, the employees including contractors, consultants, and temporary workers, and their respective job categories. The activity percentages data entry 116 may be performed by each employee, which represents the percentage of time spent for activities on his/her job. For example, a technician in the tape management organization may enter 30% of his/her time for mounting and dismounting tapes, 5% for cleaning tapes, 20% for refiling tapes, 25% for pulling scratched tapes, and 20% for relabeling tapes. Also included in the activity percentage data entry 116 are activity equipment percentages, which represent the time each type of equipment is used internally for each activity. This percentage figure is used to compute the equipment cost component for the activities.

The equipment utilization entry 118 identifies the types of equipment at the site, and provides the percentage of time each piece of equipment is utilized. For example, for a central processing unit (CPU), a time tracking application program may be used to measure equipment utilization in CPU minutes, and this information is provided as a data entry to the relational database 12. When data are electronically created such as the equipment utilization of CPUs, the data may be directly downloaded to the relational database 12 through the database server 62.

In block 122, the user enters the products that consume each identified activity, and the measurable output or end result generated by each activity if these data are not automatically downloaded. Note that each activity may support one or more products, and a measurable output may be the result of multiple activities.

In block 124, information related to space utilization is entered. For example, the total number of square feet for the facility is provided, along with the number of square feet for office space, equipment space, and un-utilized areas. For the equipment space, it is further broken down by the type of equipment that occupies the space. For example, CPU space, DASD (direct access storage device) space, and tape space are space types.

Responsibility center (R.C.) mapping to management organization is performed in block 126. The user enters the mapping relationship between the responsibility centers and the management organizations, so that the cost allocated to the responsibility centers can be distributed to the management organizations as shown in FIG. 4.

In block 128, the user enters the target or goal cost per unit of each product. This input may be used to gauge the performance of the management organization. In block 130, the percentage of cost allocated to a management organization for overhead activities is entered.

The site attributes data entries 132 include a variety of site-specific information. The site attributes 132 include information that may be unique to a specific site. Examples include activities dedicated to serve a particular customer, the production volumes of products, and activity drivers.

In addition to inputs that may require entry by users at each site, the operator of the automated activity-based management system 10 may maintain certain system-wide information. Operator control is necessary if an organization needs to ensure consistent definition across multiple sites and avoid duplications. For example, master activities block 140 represents a collection or union of all activities. The master activities list or dictionary is referred to when a site user needs to identify and account for activities performed by a management organization, as in block 116, and is maintained and updated by the system operator or administrator when a new activity is identified.

Similarly, a master list of equipment types may be entered, maintained, and updated by the system operator, as in block 142. Further, blocks 144 and 146 represent master lists of products and attributes, respectively, that are entered and maintained for the system 10. The term "products" is used herein to refer to both products and services that are the results of activities. Attributes are labels used to sort and classify data. In the automated activity-based management system 10, attributes are used to classify activities. For example, certain activities may be labeled with the quality attribute Prevention, such as hardware maintenance, training, audits because the performance of these activities eliminates the opportunity for non-conformance and ensures quality. Another set of activities may have service attributes, which indicate that these activities are related to predefined services provided to the customers. Similarly, there are also activities that are customer-specific, and are labeled with the appropriate attributes so indicating.

Activities are also given product driver and activity driver attributes. The product driver attribute identifies those products that consume the activity, and the activity driver attribute identifies what event or events initiated the performance of the activity. In addition, a label describing the measurable end results produced from each activity may also be used as an activity output attribute.

Another kind of attribute, called value-added, may be assigned to activities to indicate how crucial the activities are with respect to serving the customer. For example, Essential may be assigned to an activity because it is essential to deliver the customer's requirements on time and error-free. Other value-added attributes may include fundamental, important, standard, customary, and minimal to describe the levels of importance of an activity. As described below, the attributes may be used to generate reports containing information of specific activities identified by certain attributes.

Although certain data input functions shown in FIG. 7 may have been described as being manually entered, it is important to note that automated data importation may be implemented to take advantage of information already electronically available. For example, employees may use a time tracking software program to account for his/her time, and this information can be readily downloaded to the automated activity-based management database 12.

Referring to FIG. 8, a simplified block diagram of automated system inputs are shown. As established above in FIG. 2, the automated activity-based management system 10 is coupled to an existing computer 64, which processes and maintains the traditional accounting information. As shown in FIG. 8, the relational database 12 receives or imports three types of information from the existing computer 64. The first is the production measurement system information 150. Production measurement systems may capture product volume information by customer. A second type of information is general ledger information 152, which includes the reporting structure and the actual or budget dollar expenses for each of the cost pools. The reporting structure is the structure of the business organization's cost centers. A third type of information is human resources information on employees, which may include the employee name and number, job category, and the responsibility center.

In a forecasting or budget-generating scenario, the automated activity-based management system 10 preferably uses historical activity information, in addition to estimated projections for certain equipment utilization, activity cost information, and product volumes to generate a budget in the traditional general ledger accounting format. The system 10 is also capable of providing a forecast of activity information. Referring back to FIG. 7, similar information may be used for generating a forecast or a budget. For example if a change in personnel is anticipated, the people mapping data entry 114 reflects the anticipated change by providing the changes in full time equivalents in the job category for affected activities. Further, as related to the equipment utilization entry 118, the percent of equipment utilization by equipment type and the percent of internal usage for each management organization by equipment type may be estimated and entered into the system 10. As related to production measurement in block 122, the estimated product volumes are entered. Finally, in order to generate a traditional budget, the estimated cost for each activity performed in the organization is provided. The activity-based forecasting function requires an input of expenses and other information in the same manner as described in FIG. 7 and discussed above.

Referring to FIG. 9, a simplified data flow diagram 160 of the people component or module is shown. From the general ledger reporting structure and actual dollars downloaded from the existing computer or mainframe 64 (FIG. 2), an extraction is made to group the general ledger accounts into people cost pools by job category by responsibility center, as shown in block 162. People cost pools generally contain salary, bonus, and fringe accounts as well as accounts such as personal computer hardware, travel, and relocation, telephone expenses, office supplies, and education. Thus, people cost pools may be viewed as those accounts that fluctuate with the number of employees. Subsequently in block 164, based on the site user input, people mapping 114 and R.C. mapping to management organization 126 (FIG. 7), the dollar amount by job category for each management organization is determined. In block 166, based on the activity percentage input in block 116 (FIG. 7), the cost of each activity per job category for each management organization may be calculated.

Figure 10:
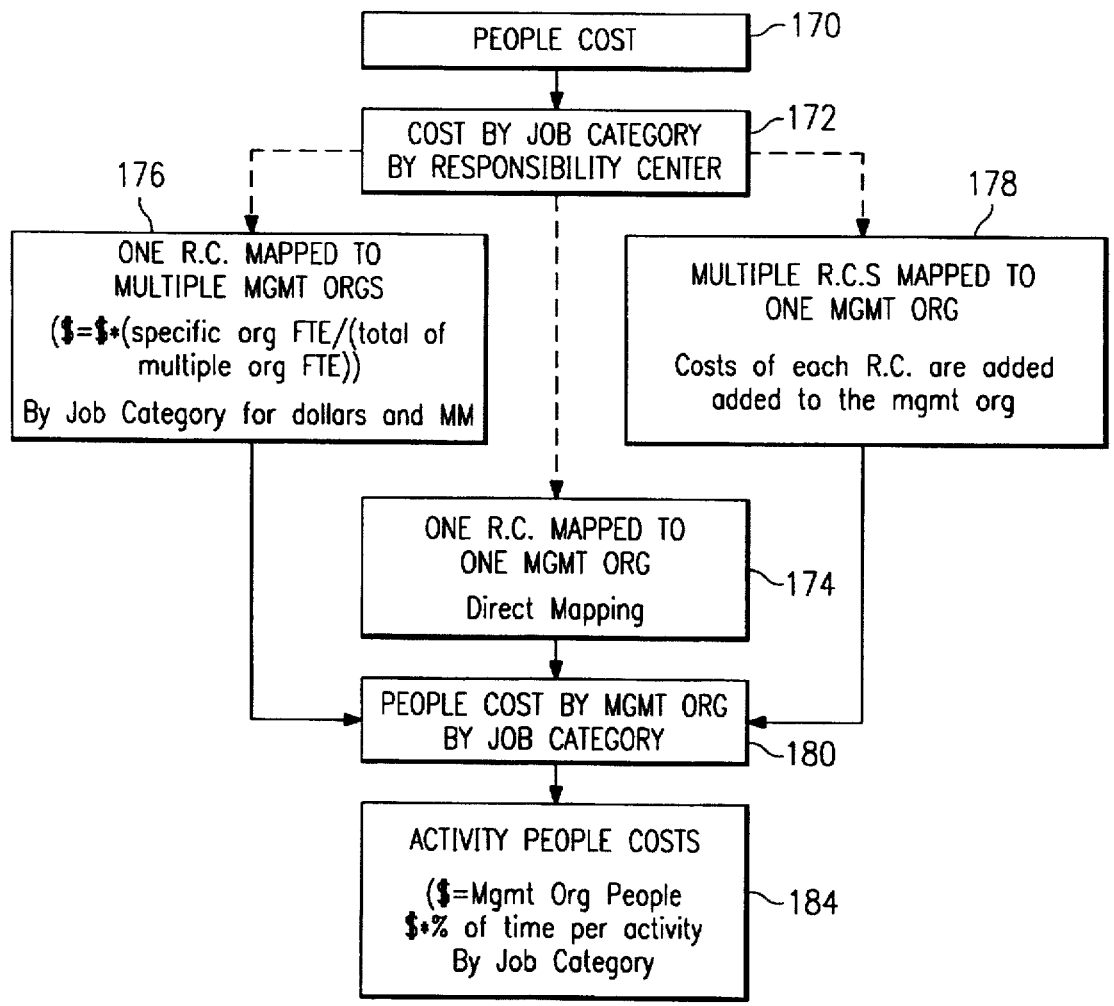
FIG. 10 is an exemplary flowchart of the people component or module.

FIG. 10 provides some detail to the people module of the automated activity-based management system 10. The general ledger accounts provides the overall people cost 170 for the site. The people costs are then extracted and put into appropriate buckets or cost pools by job category and responsibility center, as shown in block 172. According to the predetermined responsibility mapping input 126 (FIG. 7), the responsibility centers are mapped into either one management organization or multiple management organizations, 174 and 176 respectively. In addition, multiple responsibility centers may be mapped to one management organization, as shown in block 178. Thus the responsibility center mapping distributes the dollars or cost collected in responsibility centers to management organizations. With the knowledge of the cost of each management organization, and the personnel information provided in block 114 (FIG. 7), the average cost for each employee in the management organization by job category can be determined, as in block 180. From this cost and the activity percentage input 116 (FIG. 7), the cost of each activity performed can be determined, as in block 184.

The following is an example of the people module computations. As shown below, employee time expenditures are sometimes expressed in full-time equivalents (FTE), which is a unit used to represent one person working for one month.

TABLE A

EXEMPLARY PEOPLE CALCULATIONS
FOR CONFIGURATION PLANNING

| R.C. | | COST |
|---|---|---|
| 109 | Professional Compensation | $30,122.50 |
| 109 | Fringe | $3,576.43 |
| 109 | Travel | $2,067.26 |
| 109 | Other People-related costs | $202.75 |
| Total Professional Costs for R.C. 109 | | $35,968.94 |

TABLE A-continued

EXEMPLARY PEOPLE CALCULATIONS FOR CONFIGURATION PLANNING

| MGMT ORG. | PROFESSIONAL FTE | % of total Professional |
|---|---|---|
| Capacity Planning | 4 | 80.00% |
| Configuration Planning | 1 | 20.00% |
| | 5 | 100.00% |

SUMMARY:
| | | |
|---|---|---|
| Total Professional Costs for R.C. 109 | $35,968.94 | |
| Prof. $ for Configuration Planning (R.C. 109): | 20.00% → | $7,193.79 |
| Prof. $ for Configuration Planning (R.C. 014) | | + $6,627.14 |
| (calculation not shown) | | |
| Total Professional Costs for Configuration Planning: | | $ 13,820.93 |

TABLE A illustrates the computation involved to determine the total people cost by job category (professional) by responsibility center and the total people cost by job category for a management organization (Configuration Planning) mapped from two responsibility centers. (Note that R.C.109 is mapped to both Capacity Planning and Configuration Planning management organizations.) The same is done for all job categories.

Referring to FIG. 11, an exemplary dataflow diagram of the facilities module or component 24 (FIG. 1) is shown. As in the people module shown in FIGS. 9 and 10, the general ledger accounts are extracted to form cost pools by responsibility centers, as shown in block 190. In block 192, all the facilities or space cost pools for the site are summed. The sum represents the total cost of space for the site. From the total cost, the cost for three different types of space are computed, for example, including un-utilized space, space occupied by equipment, and space occupied by people or office space, as shown in blocks 194–198. For the people space, further computations are needed to determine the space cost consumed by activities. In block 200, based on the number of people utilizing space in the management organization, the space cost for the management organizations in the site are computed. Those office spaces shared by more than one person working on different shifts are also considered and taken into account. Based on the activity percentage information obtained through user input 116 (FIG. 7), the amount of money spent for space for each activity can be computed, as shown in block 202.

Figure 12:
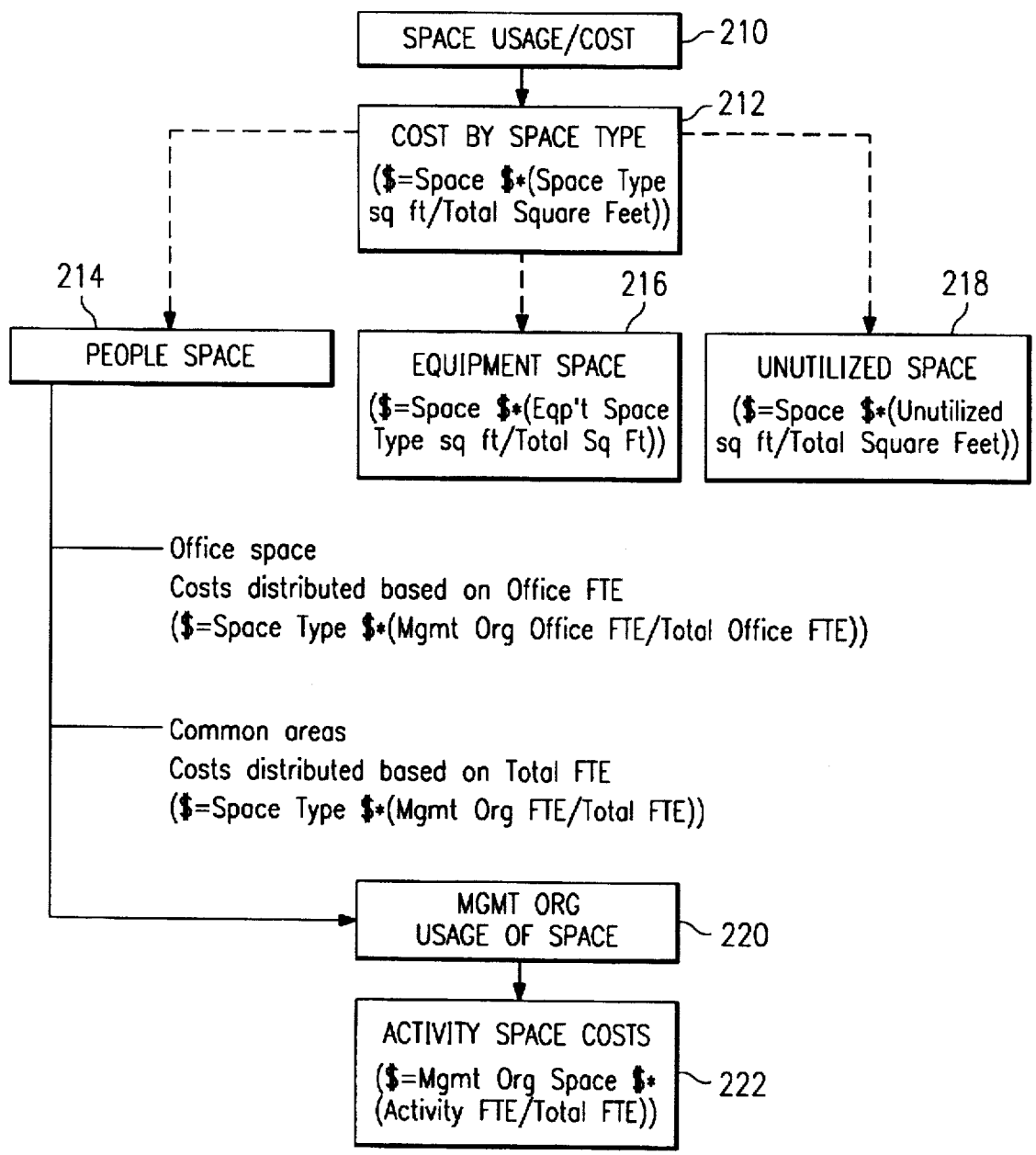
FIG. 12 is an exemplary flowchart of the facilities component or module.

FIG. 12 shows more details in the facilities computation to determine the activity space costs. The space cost for a

TABLE B

PERSONNEL MAPPING FOR CONFIGURATION PLANNING

| EMPLOYEE | % DEDICATED TO CONFIGURATION PLANNING |
|---|---|
| Professional C | 100 |
| Manager A | 40 |
| Manager B | 28 |

| | Cost/FTE | FTE | |
|---|---|---|---|
| Total Manager Cost for Configuration Planning: | $7,694.14 | 0.68 | $5,232.02 |
| Total Professional Cost for Configuration Planning: | $13,820.93 | 1.00 | $13,820.93 |
| | | | $19,052.95 |

| EMPLOYEE | ACTIVITY | JOB CATEGORY | COST/ CATEGORY * | ACTIVITY % | COST/ = ACTIVITY |
|---|---|---|---|---|---|
| B | Budget Creation | Manager | $ 7,694.14 | 5 | $ 384.71 |
| B | Manage Configuration Planning | | $ 7,694.14 | 5 | $ 384.71 |
| B | Consulting-Hardware | | $ 7,694.14 | 8 | $ 615.53 |
| B | Vendor Negotiations | | $ 7,694.14 | 5 | $ 384.71 |
| B | Develop a Configuration Plan | | $ 7,694.14 | 2 | $ 153.88 |
| B | Develop Configuration Strategy | | $ 7,694.14 | 3 | $ 230.82 |
| A | Budget Creation | Manager | $ 7,694.14 | 5 | $ 384.71 |
| A | Image Consolidation | | $ 7,694.14 | 5 | $ 384.71 |
| A | Develop A Configuration Plan | | $ 7,694.14 | 5 | $ 384.71 |
| A | Develop Configuration Strategy | | $ 7,694.14 | 5 | $ 384.71 |
| A | Manage Configuration Planning | | $ 7,694.14 | 15 | $ 1,154.12 |
| A | Migration | | $ 7,694.14 | 5 | $ 384.71 |
| C | Image Consolidation | Professional | $13,820.93 | 10 | $ 1,382.09 |
| C | Consulting-Hardware | | $13,820.93 | 2 | $ 276.42 |
| C | Hardware Forecast | | $13,820.93 | 2 | $ 276.42 |
| C | CPU Logical Partitions | | $13,820.93 | 5 | $ 691.05 |
| C | Budget Creation | | $13,820.93 | 15 | $ 2,073.14 |
| C | Develop A Configuration Plan | | $13,820.93 | 30 | $ 4,146.28 |
| C | Marketing Support | | $13,820.93 | 3 | $ 414.63 |
| C | Develop Configuration Strategy | | $13,820.93 | 15 | $ 2,073.14 |
| C | Migration | | $13,820.93 | 10 | $ 1,382.09 |
| C | New Technology Education | | $13,820.93 | 3 | $ 414.63 |
| C | Vendor Negotiations | | $13,820.93 | 5 | $ 691.05 |
| | | | | 1.68FTEs | $19,052.95 |

TABLE B illustrates how the activity cost for each employee is determined from the total cost of each job category and the activity percentages.

site is determined from general ledger account extracts, shown in block 210. The total space cost is then used to compute the cost for space used for, for example, offices, space occupied by all equipment types, and unused space, as in blocks 212. The total cost is multiplied by the ratio of the square footage measurement of each type of space utilization and the total space square footage measurement to determine the cost for each type of space.

The space occupied by people, are further broken down to space used by the employees of each management organization, as shown in block 214, to determine the different types of space used by people and different costs associated therewith. Examples of people space include offices and common areas. The office costs are allocated to activities based on office full-time equivalents to account for shared office space during different shifts. Costs for common areas are allocated to activities based on the management organization's full-time equivalents because everyone has access to this space. Common areas may include cafeterias, restrooms, lobbies, hallways, copy rooms, and conference rooms. Therefore, based on the management organization's usage of space, the cost associated with each type is computed, as shown by block 220. The costs computed for the different types of space used by the management organization are then applied to the activities performed in the management organization, as shown by block 222.

The cost allocated to equipment space is also further broken down to the types of equipment, such as CPU hardware space, tape hardware space, and direct access storage device space. This computation is shown by block 216. The un-utilized space cost is then determined from the total space cost, as shown by block 218. Un-utilized space includes offices, cubicles, and space unoccupied by employee or equipment.

The following is an example of the facilities module computations:

TABLE C

TOTAL SPACE COSTS FOR SITE = $350,085.14

| SPACE TYPE | SQ FEET | % OF TOTAL SQ FT | SPACE TYPE COSTS |
|---|---|---|---|
| Space for Power (UPS) | 10,441 | 7.24 | $25,349.67 |
| CPU Eqp. Space | 8,880 | 6.16 | $21,561.74 |
| DASD Eqp. Space | 8,889 | 6.17 | $21,582.75 |
| Tape Eqp. Space | 19,840 | 13.76 | $48,168.21 |
| LAN Server Space | 19,403 | 13.46 | $47,107.46 |
| Office | 24,788 | 17.19 | $60,183.14 |
| Other (common areas) | 22,183 | 15.38 | $53,857.10 |
| Un-utilized Space | 28,978 | 20.10 | $70,356.61 |
| Printer Space | 650 | 0.45 | $1,578.88 |
| Microfilm Space | 140 | 0.10 | $339.58 |
| Totals | 144,192 | 100.00 | $350,085.14 |

TABLE C shows how the total space cost is allocated to various types of space utilization. TABLE D below shows the computation of people space.

TABLE D

PEOPLE SPACE COST CALCULATIONS FOR CONFIGURATION PLANNING

| Management Organization | Mgmt Org. FTE | % of Site Total FTE | Mgmt Org. Office FTE | % of Site Office FTE |
|---|---|---|---|---|
| Configuration Planning | 1.68 | 0.72% | 1.68 | 1.22% |

| Space Types | Total $ | % | Mgmt Org. MO Space $ | Basis |
|---|---|---|---|---|
| Office | $60,183.14 | 1.22% | $734.23 | Office FTE |
| Other (common areas) | $53,857.10 | 0.72% | $387.77 | Total FTE |
| SPACE COSTS FOR CONFIGURATION PLANNING: | | | $1,122.00 | |

Thereafter based on the activity percentages, the people and equipment space costs can be allocated by activity as shown in TABLE E.

TABLE E

SPACE COST DISTRIBUTION TO ACTIVITIES
(CALCULATIONS OF EQUIPMENT SPACE $ NOT SHOWN)

| Activity Name | Total Time per Actv. | Actv. as % of Mgmt Org | People Space $ | Eqp't Space $ | Total Space $ |
|---|---|---|---|---|---|
| Manage Configuration Planning | 0.20 | 11.91 | $133.63 | $0.35 | $133.98 |
| Budget Creation | 0.25 | 14.88 | $166.95 | $0.00 | $166.95 |
| Image Consolidation | 0.15 | 8.93 | $100.19 | $0.32 | $100.51 |
| Consulting-Hardware | 0.10 | 5.95 | $ 66.76 | $0.00 | $ 66.75 |
| Hardware Forecast | 0.02 | 1.19 | $ 13.35 | $9.57 | $ 22.92 |
| CPU Logical Partitions | 0.05 | 2.98 | $ 33.44 | $0.00 | $ 34.39 |

TABLE E-continued

SPACE COST DISTRIBUTION TO ACTIVITIES
(CALCULATIONS OF EQUIPMENT SPACE $ NOT SHOWN)

| Activity Name | Total Time per Actv. | Actv. as % of Mgmt Org | People Space $ | Eqp't Space $ | Total Space $ |
|---|---|---|---|---|---|
| Develop A Configuration Plan | 0.37 | 22.02 | $ 247.00 | $5.29 | $ 252.29 |
| Develop Configuration Strategy | 0.23 | 13.69 | $ 153.60 | $1.82 | $ 155.42 |
| Migration | 0.15 | 8.93 | $ 100.19 | $0.00 | $ 100.19 |
| New Technology Education | 0.03 | 1.79 | $ 20.08 | $1.82 | $ 21.90 |
| Vendor Negotiations | 0.10 | 5.95 | $ 66.76 | $0.00 | $ 66.75 |
| Marketing Support | 0.03 | 1.79 | $ 20.08 | $0.00 | $ 20.08 |
| TOTALS: | 1.68 | 100.00% | $1,122.00 | $20.12 | $1,142.12 |

Figure 13:
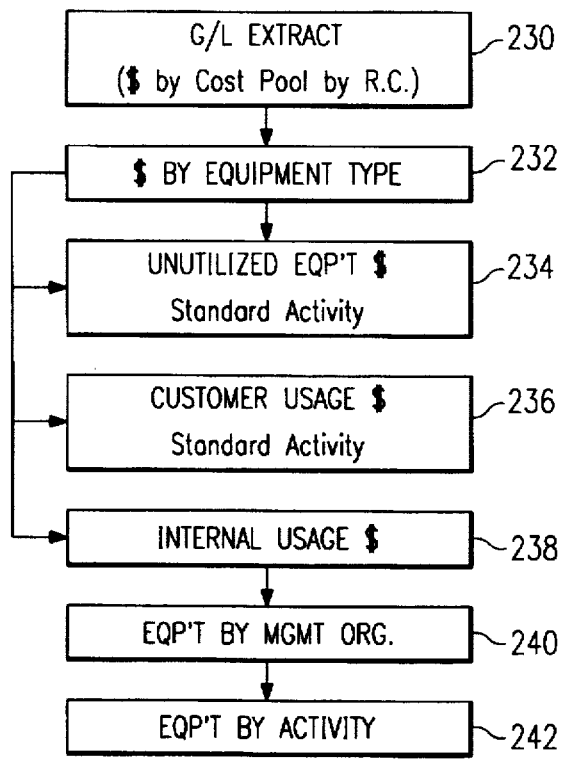
FIG. 13 is an exemplary block diagram overview of the equipment component of the activities.

FIG. 13 shows the data flow of computing for the equipment component of the costs of activities. In block 230, the general ledger accounts are grouped into cost pools by responsibility center. For example, there may be a cost pool to capture costs associated with CPU hardware, mid-range hardware, and storage devices. The cost pools per responsibility center are then divided into costs for each equipment type, as shown by block 232. Based on equipment utilization information 118 (FIG. 7) provided by the site user, the costs per equipment type can be further broken down by usage, as shown in blocks 234–238. Preferably, three equipment utilization rates are considered, including un-utilized equipment, equipment usage for customer requirements, and equipment usage for internal use. According to the access code information provided in block 132 (site attributes block in FIG. 7), the equipment usage may be mapped to management organizations, as shown in block 240. From the internally consumed equipment costs mapped to the management organizations, the equipment cost associated with each activity can be determined based on the activity percentage input in block 116 (FIG. 7).

Figure 14:
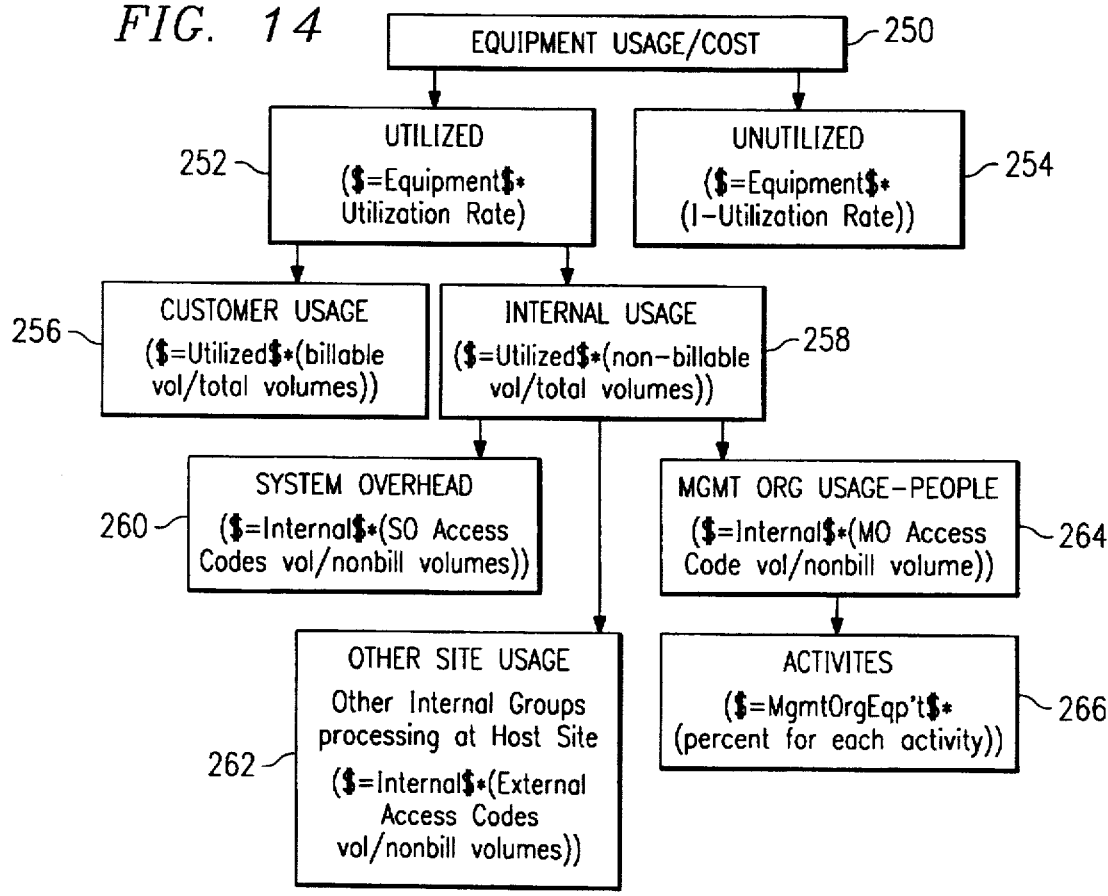
FIG. 14 is an exemplary flowchart of the equipment component or module.

FIG. 14 provides additional details for computing the equipment component of activity costs. From the general ledger, the equipment costs are allocated to appropriate cost pools, as shown in block 250. Based on the utilization rate measurement entered at each site, the equipment costs attributable to utilization and un-utilization are determined, as shown in blocks 252 and 254. The cost for equipment utilization can be further divided between internal (non-billable) usage and customer (billable) usage, as shown in blocks 256 and 258. Of the non-billable costs, a further breakdown may be made based on the utilization of the asset by the management organization. For example as shown in blocks 260–264, the internal usage may be grouped into system overhead usage, internal usage by sites other than the host site, and usage attributable to particular management organizations. The equipment usage by the management organizations can then be used to determine the equipment cost associated with each activity, based on the activity equipment percentages, as shown in block 266.

The following is an example of the equipment component computations. TABLE F shows allocation of dollars to each type of equipment, TABLE G shows calculation of equipment cost based on utilization, and TABLE H shows computation of billable and non-billable equipment costs.

TABLE F

EQUIPMENT CALCULATIONS

| R.C. # | Equipment Type | EQP Type as % of HW Pool (from RC Mapping) | Total Hardware $'s | Equipment Dollars (% * HW $'s) |
|---|---|---|---|---|
| 030 | CPU Hardware | 96.18% | $2,542,900.97 | $2,445,761.29 |
| 030 | Printer Hardware | 3.82% | $2,542,900.07 | $ 97,138.78 |
| 032 | Tape Hardware | 96.41% | $ 208,626.13 | $ 201,136.45 |
| 032 | Microfilm Hardware | 3.59% | $ 208,626.13 | $ 7,489.68 |
| 033 | DASD Hardware | 100.00% | $ 835,303.39 | $ 835,303.39 |
| | | | Total: | $3,586,829.59 |

TABLE G

HARDWARE UTILIZATION CALCULATIONS

| Equipment Type | Equipment Dollars | Utilization Rate (%) | Utilized Cost (Cost * Util %) | Un-utilized Cost (Cost * (1 - Util %) |
|---|---|---|---|---|
| CPU Hardware | $2,445,761.29 | 84.40 | $2,064,022.53 | $381,538.76 |
| Printer Hardware | $ 97,138.78 | 75.00 | $ 72,854.09 | $ 24,284.70 |
| Tape Hardware | $ 201,136.45 | 69.05 | $ 138,884.72 | $ 62,251.73 |
| Microfilm Hardware | $ 7,489.68 | 100.00 | $ 7,489.68 | $ 0.00 |

TABLE G-continued

HARDWARE UTILIZATION CALCULATIONS

| Equipment Type | Equipment Dollars | Utilization Rate (%) | Utilized Cost (Cost * Util %) | Un-utilized Cost (Cost * (1 - Util %)) |
|---|---|---|---|---|
| DASD Hardware | $ 835,303.39 | 81.45 | $ 680,354.61 | $154,948.78 |
| Totals: | $3,586,829.59 | | $2,963,805.62 | $623,023.97 |

TABLE H

CALCULATION OF EQUIPMENT COSTS (BILLABLE/INTERNAL)

| Equipment Type | **Total Usage Volumes | **Billable Usage Volumes | Billable Percent |
|---|---|---|---|
| CPU Hardware | 2,449,377 | 1,563,793 | 63.8445 |
| DASD Hardware | 92,441,738 | 49,694,887 | 53.7581 |
| Tape Hardware | 189,103 | 84,991 | 44.9443 |
| Printer Hardware | 64,258 | 64,206 | 99.9191 |
| Microfilm Hardware | 1,004,329 | 1,003,017 | 99.8694 |

| Equipment Type | Utilized Cost (Cost * Util %) | Billable Percent | Customer Core HW $ ($ * Billable %) | Internal Usage HW $ ($*(1-Billable%)) |
|---|---|---|---|---|
| CPU Hardware | $2,064,222.53 | 63.8445 | $1,317,892.55 | $746,329.98 |
| Printer Hardware | $72,854.09 | 99.9191 | $72,795.08 | $59.01 |
| Tape Hardware | $138,884.72 | 44.9443 | $62,420.77 | $76,463.95 |
| Microfilm Hardware | $7,489.68 | 99.8694 | $7,479.89 | $9.79 |
| DASD Hardware | $680,354.61 | 53.7581 | $365,745.71 | $314,608.90 |

Figure 15:
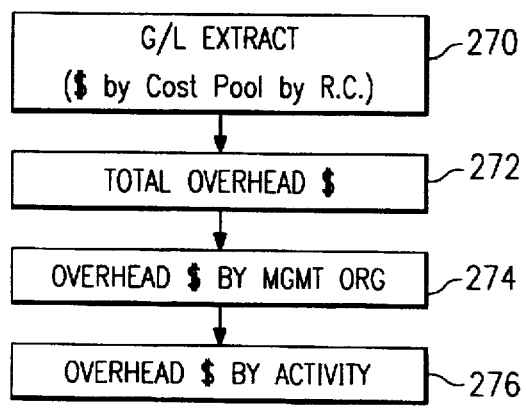
FIG. 15 is an exemplary block diagram overview of the overhead component of the activities.

The cost associated with overhead is also computed in a similar manner and shown in FIG. 15. The general ledger accounts are first grouped into cost pools, as shown in block 270. In block 272, the costs of all cost pools associated with overhead are summed. This represents the total overhead cost for the site. Based on the percentage of the management organization's value received from overhead functions, the management organization is allocated the same Percentage of the total overhead cost, as shown in block 274. From the computed overhead cost, the overhead cost by activity can be determined based on the percentage of the activities' costs with respect to the total management organization cost, as shown in block 276.

Figure 16:
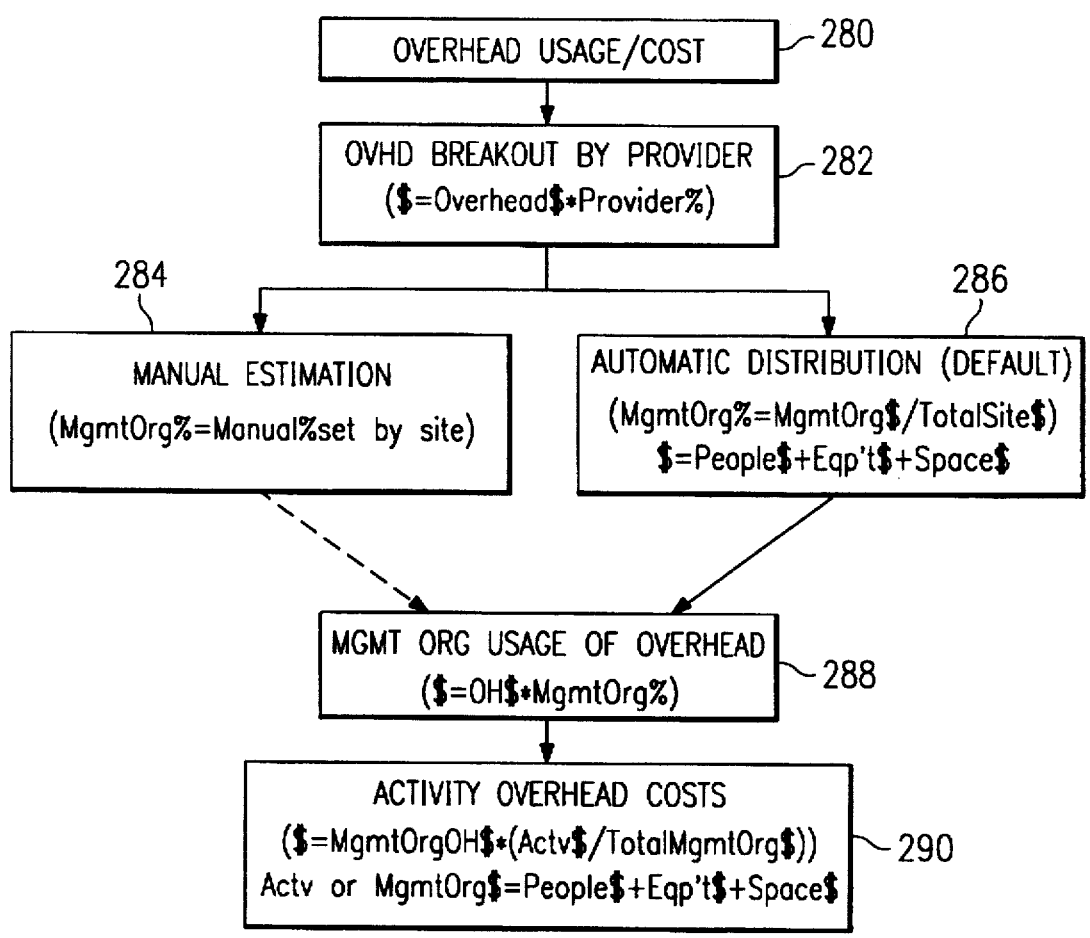
FIG. 16 is an exemplary flowchart of the overhead component or module.

FIG. 16 provides additional details to the overhead cost component computation. The general ledger account information is used to determine the overhead costs, as shown in block 280. The total overhead cost for the site is then allocated to service providers which make up the overhead of the business organization. The allocation is done according to a percentage of overhead costs controlled by each service provider, as shown in blocks 282. Examples of service providers may include recruiting, legal, human resources, account services, and research and development. The cost for each service provider is then distributed to the management organization level either via user-provided percentages or with an automatic default, as shown in blocks 284 and 286. The default computed percentage is based on the percentage of the management organization's people, space and equipment costs with respect to the total site cost. The percentage then may be used to compute the overhead cost for the management organization, as shown in block 288. Based on the activity percentages, the overhead cost of each activity attributable to the management organization is computed, as shown in block 290. Overhead cost computations are shown in TABLES I and J below.

TABLE I

OVERHEAD CALCULATIONS FOR CONFIGURATION PLANNING

| * Service Provider | % by Provider | $ by Provider |
|---|---|---|
| Account Svcs Pool | 6.43 | $84,537.50 |
| Infrastructure Eng. | 8.73 | $114,776.42 |
| Operations Supt Pool | 42.09 | $553,372.22 |
| Resource Svcs Pool | 7.21 | $94,792.44 |
| S G & A Pool | 35.54 | $467,257.04 |
| Overhead Total: | 100.00% | $1,314,735.62 |

| Provider | $ by Provider | Default * OH $'s | OH $ for Mgmt Org. |
|---|---|---|---|
| Account Svcs Pool | $84,537.50 | 0.3867 | $326.91 |
| Infrastructure Eng. | $114,776.42 | 0.3867 | $443.84 |
| Operations Supt Pool | $553,372.22 | 0.3867 | $2,139.89 |
| Resource Svcs Pool | $94,792.44 | 0.3867 | $366.56 |
| S G & A Pool | $467,257.04 | 0.3867 | $1,806.88 |
| Overhead Costs for Configuration Planning: | | | $5,084.08 |

*Percentage = (Configuration Planning's Expenses/Total Site Expenses)

TABLE J

DISTRIBUTION OF OVERHEAD DOLLARS TO ACTIVITIES FOR CONFIGURATION PLANNING

| Activity Name | Actv. People $ | Actv. Eqp't $ | Actv. Space $ | Sub-Total (Pep + Eqp + Fac) | % of Sub-Total | %5,084.08 Overhead $ | Total Actv. $ |
|---|---|---|---|---|---|---|---|
| Manage Configuration Planning | $1,538.83 | $1.45 | $173.82 | $1,714.10 | 7.95% | $404.08 | $2,118.19 |
| Budget Creation | $2,842.51 | $0.00 | $216.84 | $3,059.35 | 14.19% | $721.21 | $3,780.57 |
| Image Consolidation | $1,766.77 | $39.38 | $130.43 | $1,936.5 | 8.98% | $456.53 | $2,393.11 |
| Consulting-Hardware | $891.94 | $0.00 | $86.73 | $978.67 | 4.54% | $230.71 | $1,209.39 |
| Hardware Forecast | $276.41 | $478.11 | $26.91 | $781.43 | 3.62% | $184.22 | $965.65 |
| — | — | — | — | — | — | — | — |
| — | — | — | — | — | — | — | — |
| Migration | $1,766.77 | $0.00 | $130.11 | $1,896.88 | 8.80% | $447.17 | $2,344.06 |
| New Technology Education | $414.62 | $83.81 | $27.85 | $526.28 | 2.44% | $124.07 | $650.34 |
| Vendor Negotiations | $1,075.74 | $0.00 | $86.73 | $1,162.47 | 5.39% | $274.04 | $1,436.51 |
| Marketing Support | $414.62 | $0.00 | $26.03 | $440.65 | 2.04% | $103.88 | $544.52 |
| TOTAL: | | | | $21,566.38 | 100.00% | $5,084.08 | $26,650.48 |

Therefore, the cost of an activity is the sum of the costs of people, space, equipment, and overhead components. Based on the activity cost, meaningful information may be derived and reported.

The automated activity-based management system 10 may generate a number of different reports summarizing information for many business purposes. Examples of the types of reports available are: products, equipment, quality, activity driver, service, value added, user profile, and budget. The various types of reports are summarized below:

PRODUCTS

Site Trend Product Reports—Details a site's product costs, product volumes, and product cost per volume for up to any number of months. Shows the impact of cost reduction on specific products, as well as the impact of increasing/decreasing volumes on the product cost per volume. Using "drill-down", users can view a selected product in terms of standard services, full-time equivalents, management organizations, or individual activities/costs that contribute to that product's cost.

Site Product Costs by Management Organization Report—Shows the contribution of each management organization to a selected product's costs. Users can "drill-down" to the activities performed within each organization.

Product Benchmark—Enables a site to track the trend of actual product cost versus the target product cost. Via the benchmark analyses, a site can compare the results to the lowest cost site as well as the average of all comparable sites.

Site Comparison Trend Reports—Details product costs, product volumes, and product cost per unit for all comparable sites for any number of months. Allows an individual site to compare its unit costs to other sites with comparable products. By using the "drill-down" capability, a user can view other sites' trend reports and activities. Sites can leverage each other's experiences and modify processes to achieve greater efficiencies.

Site Comparison/6 Month Average Report—Shows the six month average product cost per unit for the selected site, lowest cost site, and the average unit cost for all products. Variances are also calculated between the selected site's product cost per unit and the lowest cost site, as well as the management organization average cost per unit. Enables sites to compare their product costs and target products for cost reduction by discussing process differences with the lowest cost site.

Site Comparison Product Reports—Details product costs, product volumes, and product cost per unit for all comparable sites for the current month. Allows a site to compare its unit costs to other sites with comparable products. By using the "drill-down" capability, a user can view other sites' trend reports and activities. Sites can leverage each other's experiences and modify processes to achieve greater efficiencies.

Consolidated Trend Product Reports—Sums the product costs, product volumes, and product cost per unit for comparable sites for any number of months. Allows users to view the results of cost reductions, process improvements, and business fluctuations. Highlights the effect of volume changes on the cost per unit calculation.

EQUIPMENT

Non-Billable Equipment—Shows the non-billable cost and volume detail by equipment type for each processing site. Allows users to view the management organizations at the site which are internally utilizing the equipment as well as any other non-customer business organizations that are consuming resources at the processing site.

QUALITY

Quality Benchmark—Enables a site to track the trend of price of non-conformance cost. Via the Benchmark analyses, a site can compare the results to the best site as well as the average of all comparable sites.

Site Trend Quality Reports—Details a site's costs by quality attribute for any number of months. Users can track the results of quality initiatives that have been implemented. Users can view the individual activities/costs that contribute to a selected quality attribute in order to pinpoint opportunities for quality improvements.

Site Comparison Quality Reports—Details costs by quality attribute for all comparable sites for the current month. By using the "drill-down" capability, a manager can view other sites' trend reports and activities. Sites can leverage each other's experiences and modify processes to reduce occurrences of non-conformance.

Consolidated Trend Quality Reports—Sums the costs by quality attribute for comparable sites for any number of months. Allows users to view the results of quality initiatives.

ACTIVITY DRIVER

Site Trend Activity Driver Reports—An activity driver is the event/trigger that causes an activity to be performed. These reports detail a site's activity driver costs, activity driver volumes, and cost per activity driver for any number of months. Shows the impact of changing the number of occurrences of a particular activity driver.

SERVICE/PROCESS

Service/Process Benchmark—Enables a site to track their trend of actual service costs. Via the benchmark analyses, a site can compare their results to the best site as well as the average of all comparable sites.

Site Trend Service Reports—Details a site's standard services costs for any number of months. Shows the impact of business changes on specific services. By utilizing the "drill-down", users can view the individual activities/costs that contribute to a selected standard service's cost.

Site Comparison Service Reports—Details service costs for all comparable sites for the current month. Allows an individual site to compare its costs to other sites with comparable services. By using the "drill-down" capability, a user can view other sites' trend reports and activities. Sites can leverage each other's experiences and modify processes to achieve greater efficiencies.

Consolidated Trend Service Reports—Sums the services costs for all comparable sites for any number of months. Allows users to view the results of cost reductions, process improvements, business fluctuations, and customer base changes.

VALUE ADDED

Value-Added Trend Reports—Details a site's costs by value-added attribute for any number of months. Users can view the individual activities/costs that contribute to a selected value-added attribute in order to emphasize the activities that add the most value.

Site Comparison Value-Added Reports—Sums costs by value-added attribute for all comparable sites for the current month.

USER-PROFILE REPORTING

Matrix Report—Details all activities, employees, activity attributes, FTEs, and costs for a selected management organization for the current month. Allows a user to see the cost components for activities within a first level manager's responsibility. A user can view which activities people are performing, and change priorities as needed.

Activity Output Report—Activity Output is the "output" (result) of performing an activity. This report lists each activity with its activity output, activity output quantity, activity cost, and cost per activity output unit for a selected management organization.

Data Integrity Report—Allows users to verify that input to the automated activity-based management system 10 is valid. For example, the report will highlight if equipment utilization rates have not been input, or if product volumes are missing.

In addition to the above-listed reports, forecasting reports are provided. There are two types: activity-based forecasting and traditional forecasting. Activity-based forecasting provides future spending information in terms of activities, while traditional forecasting provides future money allocation in a traditional accounting information format. The reports available under activity-based forecasting provide the same type of activity-based cost information that are available when current data are evaluated. The forecast reports include the product unit costs, product costs and volumes reports, site comparisons, benchmarks, and variance. The variance reports compare the current forecasts to actual costs and to previous forecasts.

On the other hand, the traditional forecasting reports generate a summary of projected costs in the form of traditional general ledger accounts. The system 10 generates a budget in the traditional accounting format familiar to executives and managers making budget approval and resource utilization decisions. Essentially, the automated activity-based system 10 is capable of beginning with the traditional accounting information such as production measurement system, human resources and the general ledger creating the activity-based information to provide current performance evaluation as activity-based forecasts. The system 10 is also capable of proceeding from the estimated activity-based information to the traditional general ledger accounts to provide traditional budgets. Constructed in this manner, the system 10 has great flexibility in supplying the type of information needed for the tasks at hand.

Figure 17:
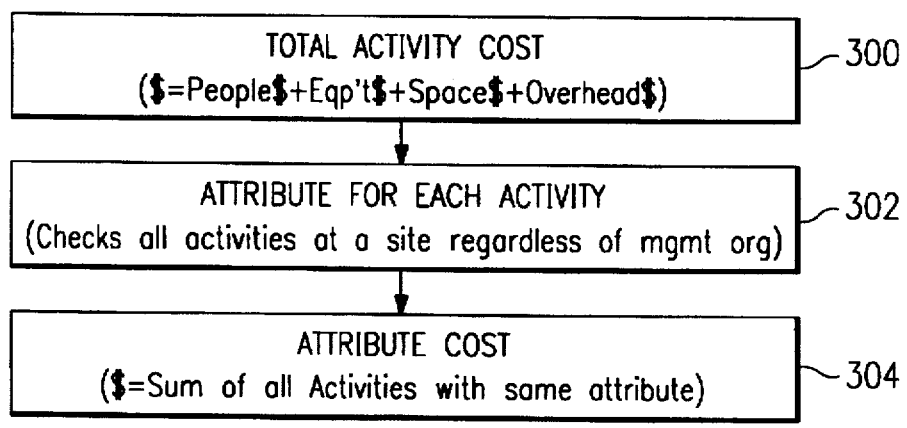
FIG. 17 is an exemplary block diagram overview of attribute computations.
Figure 18:
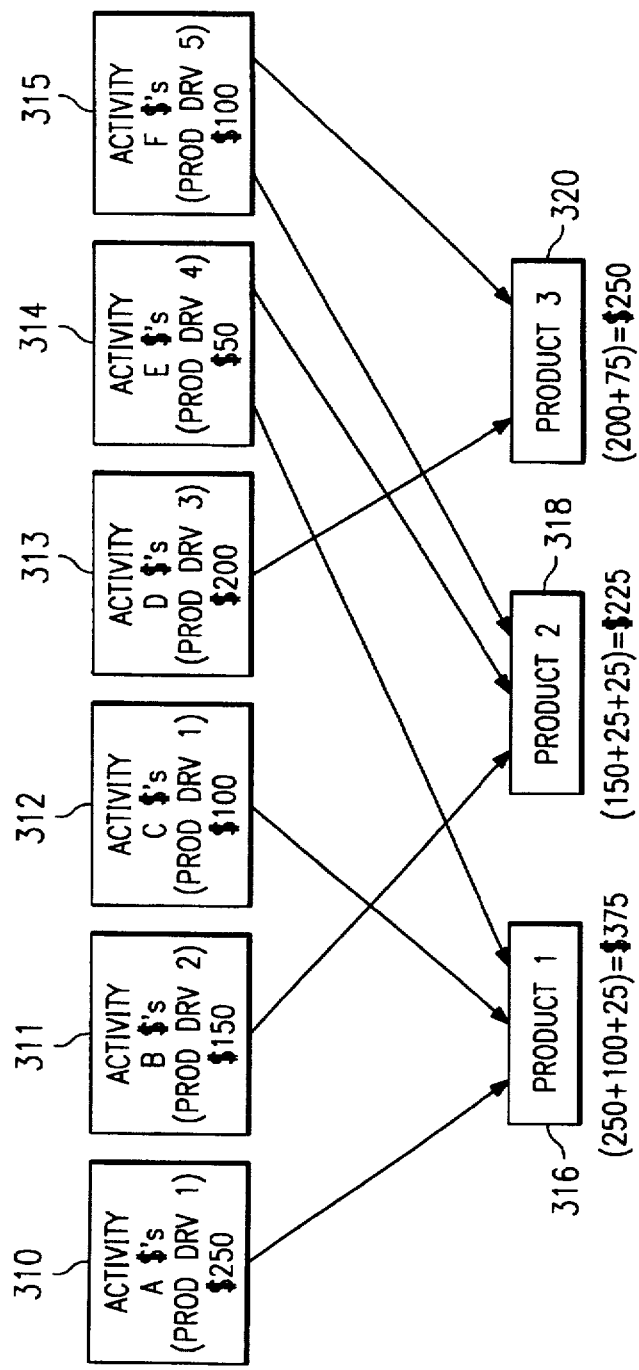
FIGS. 18A and 18B are exemplary block diagram and tabular representation of product cost computations.
Figure 19:
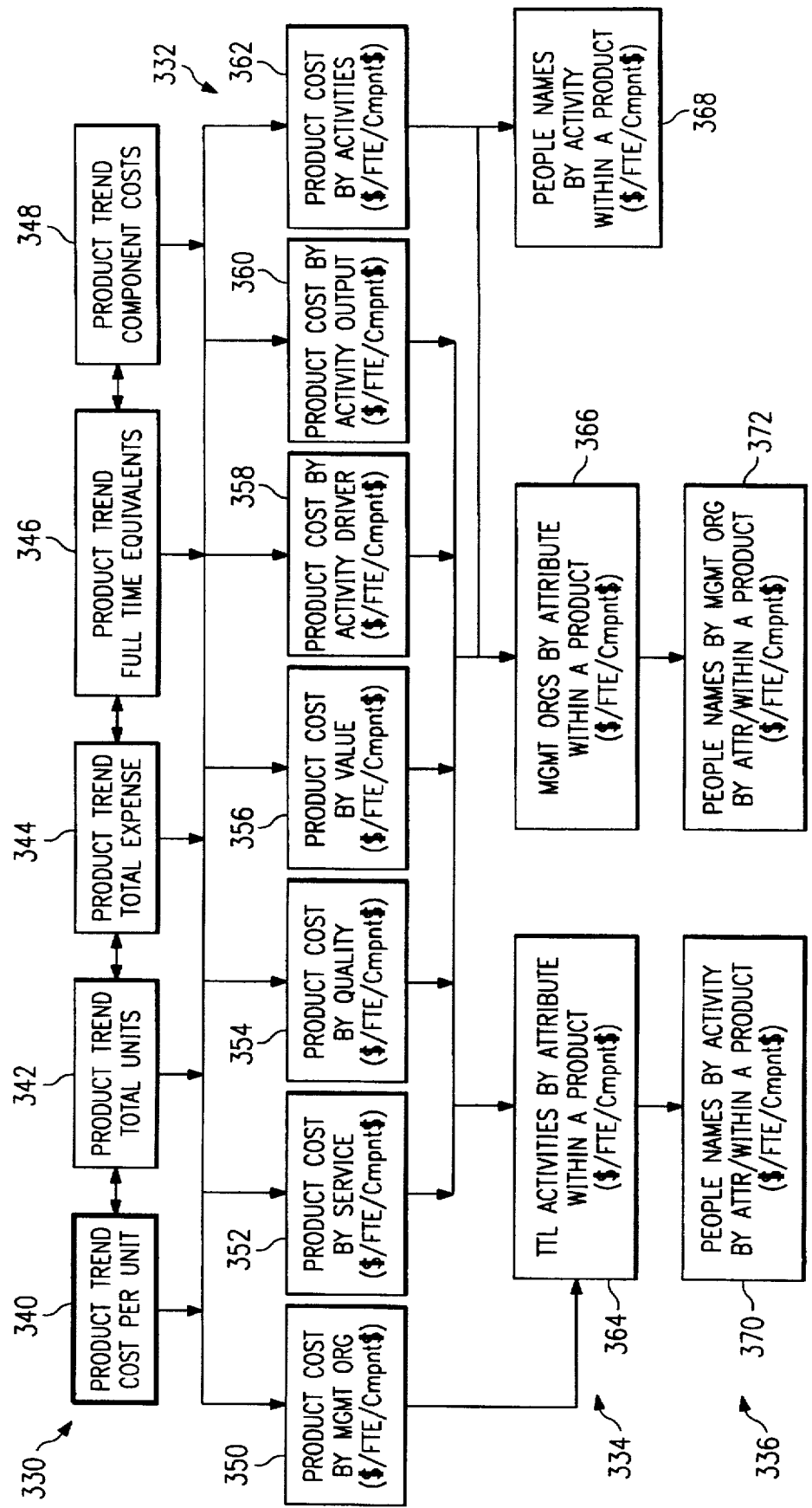
FIG. 19 is an exemplary block diagram of the report drill-down function.

FIGS. 17–19 are directed to the reporting aspects of the automated activity-based management system 10. FIG. 17 shows how an attribute cost may be computed. Recall that an attribute is a label used to sort data and classify activities. Knowing the cost of each activity, the cost of those activities with a specific attribute can be extracted by summing all the activity costs, as shown in blocks 300–304. For example, a manager may want to know how the cost of essential value-added activities compare with standard, customary and minimal value-added activities. A value-added report would provide this information.

FIGS. 18A and 18B are block diagram and tabular representation of product cost computation for product-related reports. Based on the product driver indicating the product/services produced by the activity, the cost of the activities 310–315 are mapped to three products 316–320. As shown, product 1 is the output of activities A, C, and E; product 2 is the output of activities B, E, and F; and product 3 is the output of activities D and F. Therefore, the cost to produce each product is the sum of the activity costs contributing to the making of the product. The resulting number is a more meaningful and reliable measurement of the actual cost of the product.

When a user is perusing a report on-line at the user workstation 72 (FIG. 2) through the graphical user interface, the user may elect to "drill-down" deeper into the report to determine how a particular dollar figure or a particular piece of information is derived. FIG. 19 demonstrates this "drill-down" capability in a product trend report for a site. The report has four detail levels 330–336, each of which displays a different layer of information. The topmost layer 330 are the site trend reports showing the unit costs 340, total units or product volumes 342, total expenses 344, full time equivalents 346, and component (people, equipment, facilities, overhead) costs 348. Accessible from the site trend product reports 330 are the activity lists and cost details for each product. For example in level 332, the product costs for each management organization, the product costs by service, product cost by quality code, product cost by value, product cost by activity driver, product cost by activity output, and product cost by activities are accessible, as shown by blocks 350–362. From level 332, the total activity cost by attribute within a product, management organization cost by attribute within a product, and names of people by activity within a product are accessible, as shown by blocks 364–368. Further down, the names of people by activity by attribute within a product and people's names by management organization by attribute within a product are also accessible, as shown by blocks 370 and 372.

Similar drill-down capabilities are also provided to other types of reports to provide varying scopes of information. If desired, certain levels of information or certain types of reports may require security clearance for access to limit and control the number of personnel having access to the information.

The automated activity-based management system 10 can be used strategically for several purposes. The system 10 may be used as a management tool to make strategic and operational decisions. The system 10 may be used to establish a target cost for each product, and evaluate the cost/ benefit of excess capacity, and compare the performance of different sites. The system 10 allows managers to identify all activities, prioritize the activities, and quantify resources consumed by the activities. Adjustment may be made to eliminate or de-emphasize low value or unnecessary activities and emphasize high value activities. From the information provided, it is also readily apparent what resources are un-utilized or under-utilized. Provisions may be made to better utilize the resources or share resources with other management organizations.

Although the present invention and its advantages have been described in detail, it should be understood that various changes, substitutions and alterations can be made therein without departing from the spirit and scope of the invention as defined by the appended claims.

What is claimed is:

1. An automated activity-based management system for a business organization having costs associated with its people, facilities, and equipment to produce products and/or provide services, said business organization having accounting information including an accounting structure and expenses stored electronically in a storage device, comprising;
    at least one computer workstation having an user interface accepting activity information including information related to percentages of time spent on each activity by the people, and utilization information related to said facilities and equipment;
    a relational database coupled to said storage device and said at least one computer workstation automatically downloading, receiving and storing said accounting information from said storage device, and receiving said activity information from said computer workstation; and
    a database server coupled to said relational database and said computer workstation dynamically processing said accounting information and said activity information in response to requests received from said computer workstation, and mapping said expenses to the costs associated with the people, facilities, and equipment components of each activity, to determine a component cost allocation for each activity.

2. The automated activity-based management system, as set forth in claim 1, further comprising:
    a people module residing in the database server operable to process said accounting information and said activity information, and generate a people cost component associated with each activity;
    a facilities module residing in the database server operable to process said accounting information and said activity information, and generate a facilities cost component associated with each activity; and
    an equipment module residing in the database server operable to process said accounting information and said activity information, and generate an equipment cost component associated with each activity.

3. The automated activity-based management system, as set forth in claim 2, further comprising a reporting module generating reports having cost summaries based on said people, facilities, equipment, and overhead cost components of said activities.

4. The automated activity-based management system, as set forth in claim 3, wherein said cost summaries include trend reports, cost comparison reports, and benchmark reports.

5. The automated activity-based management system, as set forth in claim 3, wherein said reporting module further generates a forecast having people, facilities, equipment, and overhead cost projections.

6. The automated activity-based management system, as set forth in claim 3, wherein said reporting module further generates a budget having accounting information.

7. The automated activity-based management system, as set forth in claim 3, wherein said reporting module further includes a drill-down function module operable to provide varying depths of information and combinations of multiple activity attributes.

8. The automated activity-based management system, as set forth in claim 2, wherein the business organization also has costs associated with overhead, and the system further comprising an overhead module residing in the database server operable to process said accounting information and said activity information, and generate an overhead cost component associated with each activity.

9. The automated activity-based management system, as set forth in claim 1, wherein said accounting structure defines a plurality of responsibility centers, said expenses being captured in said responsibility centers.

10. The automated activity-based management system, as set forth in claim 9, wherein said relational database receives and stores an association relationship between said responsibility centers and at least one management organization.

11. The automated activity-based management system, as set forth in claim 1, wherein said relational database further receives and stores a master list of activities, a master list of attributes used to classify said activities, a master list of products, and a master list of equipment.

12. The automated activity-based management system, as set forth in claim 1, wherein said relational database further receives and stores activity percentage information representing the percentage of time spent by the people on each activity.

13. The automated activity-based management system, as set forth in claim 1, wherein said relational database further receives and stores facilities utilization information and equipment utilization information.

14. The automated activity-based management system, as set forth in claim 1, wherein said relational database receives and stores information associated with the business organization structure and how the employees fit within the structure.

15. The automated activity-based management system, as set forth in claim 1, wherein said relational database receives and stores information identifying those activities producing the products.

16. The automated activity-based management system, as set forth in claim 1, wherein said relational database further receives and stores a target cost per unit for each of said products.

17. The automated activity-based management system, as set forth in claim 1, wherein said relational database further receives and stores product drivers identifying at least one product resulting from each of said activities.

18. The automated activity-based management system, as set forth in claim 1, wherein said relational database further receives and stores human resources information including people names and job categories.

19. The automated activity-based management system, as set forth in claim 1, wherein said relational database further receives and stores access code data used for identifying equipment usage by customers and management organizations.

20. The automated activity-based management system, as set forth in claim 1, wherein said user interface is a graphical user interface.

21. The automated activity-based management system, as set forth in claim 1, wherein said storage device and said database server are connected in a computer network.

22. The automated activity-based management system, as set forth in claim 1, wherein said storage device, said database server, and said computer workstation are connected in a computer network.

23. An automated activity-based management system for a business organization occupying facilities, employing people and using equipment, the business organization generating traditional accounting information including accounting structures and expenses, comprising:

- a relational database automatically receiving said traditional accounting information and accepting information related to activities provided by users, said activity information includes the activities performed, the percentage of time each activity is performed, equipment utilization data, and space utilization data;
- a people module operable to process said traditional accounting information and said activity information and generate a people cost component associated with each activity;
- a facilities module operable to process said traditional accounting information and said activity information and generate a facilities cost component associated with each activity;
- an equipment module operable to process said traditional accounting information and said activity information and generate an equipment cost component associated with each activity; and
- a reporting module operable to generate cost summaries, of said activities in response to said generated cost components.

24. The automated activity-based management system, as set forth in claim 23, wherein said business organization is divided into sites, and each site is divided into management organizations, and said equipment module further computes expenses to equipment used to perform the activities in each management organization.

25. The automated activity-based management system, as set forth in claim 24, wherein said relational database further receives and stores activity information including the types of equipment, the utilization rate of each equipment type for satisfying customer requirements and internal usage, and un-utilization rate.

26. The automated activity-based management system, as set forth in claim 25, wherein said equipment module further computes expenses to un-utilized equipment time, equipment utilization for satisfying customer requirements and for internal usage for each management organization.

27. The automated activity-based management system, as set forth in claim 26, wherein said equipment module further differentiates internal usage expenses incurred by people of a different site.

28. The automated activity-based management system, as set forth in claim 23, wherein said business organization is divided into sites, and each site is divided into management organizations, and said people module further allocates expenses to activities performed by the people of each management organization.

29. The automated activity-based management system, as set forth in claim 28, wherein said relational database further receives and stores activity information including people names and job categories for each management organization.

30. The automated activity-based management system, as set forth in claim 29, wherein said people module further computes expenses to activities performed by people of each management organization by job category.

31. The automated activity-based management system, as set forth in claim 23, wherein said business organization is divided into sites, and each site is divided into management organizations, and said facilities module further computes expenses to facilities used to perform the activities in each management organization.

32. The automated activity-based management system, as set forth in claim 31, wherein said relational database further receives and stores activity information including total amount of space at the site, amount of space utilized by people, and amount of space occupied by equipment.

33. The automated activity-based management system, as set forth in claim 32, wherein said facilities module further computes expenses to un-utilized space, space occupied by equipment, and space utilized by people to perform the activities in each management organization.

34. The automated activity-based management system, as set forth in claim 23, further comprising a reporting module generating reports having cost summaries based on said people, facilities, equipment, and overhead cost components of said activities.

35. The automated activity-based management system, as set forth in claim 34, wherein said cost summaries include trend reports, cost comparison reports, and benchmark reports.

36. The automated activity-based management system, as set forth in claim 34, wherein said reporting module further generates a forecast having people, facilities, equipment, and overhead cost projections.

37. The automated activity-based management system, as set forth in claim 34, wherein said reporting module further generates a budget having traditional accounting information.

38. The automated activity-based management system, as set forth in claim 34, wherein said reporting module further includes a drill-down function module.

39. The automated activity-based management system, as set forth in claim 23, wherein said traditional accounting information is stored on a storage device, said storage device downloads said traditional accounting information to said relational database.

40. The automated activity-based management system, as set forth in claim 39, further comprising a database server coupled to said relational database and a computer network connecting said storage device and said database server.

41. The automated activity-based management system, as set forth in claim 39, further comprising a database server coupled to said relational database and a computer network connecting said storage device, said database server, and said computer workstation.

42. The automated activity-based management system, as set forth in claim 23, wherein said business organization is divided into sites, and each site is divided into management organizations, and said overhead module further computes expenses to overhead costs in the performance of the activities in each management organization.

43. The automated activity-based management system, as set forth in claim 23, wherein said relational database further receives and stores a master list of activities, a master list of attributes used to classify said activities, a master list of products, and a master list of equipment.

44. The automated activity-based management system, as set forth in claim 23, wherein said relational database receives and stores information identifying those activities producing the products.

45. The automated activity-based management system, as set forth in claim 23, wherein said relational database further receives and stores a target cost per unit for each of said products.

46. The automated activity-based management system, as set forth in claim 23, wherein said relational database further receives and stores product drivers identifying at least one product resulting from each of said activities.

47. The automated activity-based management system, as set forth in claim 23, wherein said accounting structure defines a plurality of responsibility centers, and said business organizations is divided into management organizations, said expenses being captured in said responsibility centers, and said responsibility centers being mappable to said management organizations.

48. The automated activity-based management system, as set forth in claim 23, wherein said relational database further receives and stores human resources information including people names and job categories.

49. The automated activity-based management system, as set forth in claim 23, wherein said relational database further receives and stores access code data used for identifying equipment usage by customers and management organizations.

50. The automated activity-based management system, as set forth in claim 23, further comprising an overhead module operable to process said traditional accounting information and said activity information and generating an overhead cost component associated with each activity.

51. The automated activity-based management system, as set forth in claim 23, further comprising a computer workstation having a graphical user interface.

52. An automated activity-based method for managing a business organization, the business organization occupying facilities and having people using equipment, the business organization generating traditional accounting information including accounts and expenses, the method comprising the steps of:

- automatically downloading the traditional accounting information to a relational database;
- feeding activity information including activities performed by employees, the percentage of time employees spend on performing each activity, equipment utilization rates, and facility utilization to said relational database;
- computing from the activity information and the accounting information a people cost component associated with each activity;
- computing from the activity information and the accounting information a facilities cost component associated with each activity;
- computing from the activity information and the accounting information an equipment cost component associated with each activity; and
- generating reports summarizing said computed cost components associated with each activity.

53. The method, as set forth in claim 52, further comprising the step of computing an overhead cost component associated with each activity.

54. The method, as set forth in claim 53, wherein said overhead component cost computing step comprises the steps of:

- computing an overhead cost by cost pool by responsibility center from the traditional accounting information accounts and expenses, the cost pools and responsibility centers being financial divisions of the business organization;
- mapping the overhead cost by cost pool by responsibility center to management organizations, the management organizations being functional divisions of the business organization;
- computing the overhead costs of the business organizations by management organization;
- computing an overhead cost for each activity.

55. The method, as set forth in claim 54, wherein the step of feeding activity information includes the step of feeding overhead activity information, and the step of computing the overhead costs includes the step of computing the overhead activity cost by management organization based on the percentage of the activity people, equipment and facilities cost with respect to a total management organization cost.

56. The method, as set forth in claim 54, wherein the step of feeding activity information includes the step of feeding overhead activity information, and the step of computing the overhead costs includes the step of computing the overhead activity cost by management organization based on a predetermined percentage of a total management organization cost.

57. The method, as set forth in claim 54, wherein said facilities component cost computing step comprises the steps of:

- computing a facilities cost by cost pool by responsibility center from the traditional accounting information accounts and expenses, the cost pools and responsibility centers being financial divisions of the business organization;
- mapping the facilities cost by cost pool by responsibility center to management organizations, the management organizations being functional divisions of the business organization;
- computing the facilities costs of the business organizations by facility usage;
- computing a facilities cost for each activity.

58. The method, as set forth in claim 57, wherein the step of feeding activity information includes the step of feeding facility utilization by people, facility utilization by equipment, and un-utilized space, and the step of computing the facilities costs includes the step of computing the un-utilized space cost, equipment space cost, and people space cost.

59. The method, as set forth in claim 52, wherein said equipment component cost computing step comprises the steps of:

- computing an equipment cost by cost pool by responsibility center from the traditional accounting information accounts and expenses, the cost pools and responsibility centers being financial divisions of the business organization;
- mapping the equipment cost by cost pool by responsibility center to management organizations, the management organizations being functional divisions of the business organization;
- computing the equipment costs of the business organizations by usage type;

computing an equipment cost for each activity.

60. The method, as set forth in claim 59, wherein the step of feeding activity information includes the step of feeding equipment utilization rate for customer use, equipment utilization rate internal, and un-utilization rate, and the step of computing the equipment costs includes the step of computing the un-utilized equipment cost, internal usage equipment cost, and customer usage equipment cost.

61. The method, as set forth in claim 57, wherein said people component cost computing step comprises the steps of:

computing a people cost by job category by responsibility center from the traditional accounting information accounts and expenses, the responsibility centers being financial divisions of the business organization;

mapping the people costs by job category by responsibility center to management organizations, the management organizations being functional divisions of the business organization;

computing a cost per employee by management organization by job category; and computing a people cost for each activity.

62. The method, as set forth in claim 52, further comprising the steps of:

downloading human resources information; and downloading product volume information and equipment access code information.

63. The method, as set forth in claim 52, wherein the step of feeding activity information includes the step of feeding a target cost per unit of product.

64. The method, as set forth in claim 52, wherein the step of feeding activity information includes the step of feeding product drivers identifying at least one product resulting from each of said activities.

65. The method, as set forth in claim 52, wherein the step of feeding activity information includes the step of feeding information mapping access codes supplied in the traditional accounting information to each management organization, the management organizations being functional divisions of the business organization.

66. The method, as set forth in claim 52, wherein the step of feeding activity information includes the step of feeding and maintaining a master activity dictionary.

67. The method, as set forth in claim 52, wherein the step of feeding activity information includes the step of feeding and maintaining a master attribute dictionary, attributes being labels used to classify activities.

68. The method, as set forth in claim 52, wherein the step of feeding activity information includes the step of feeding and maintaining a master product dictionary.

69. The method, as set forth in claim 52, wherein the step of feeding activity information includes the step of feeding and maintaining a master equipment dictionary.

70. The method, as set forth in claim 52, wherein the report generating step includes the step of generating a trend report.

71. The method, as set forth in claim 52, wherein the report generating step includes the step of generating a benchmark report.

72. The method, as set forth in claim 52, wherein the report generating step includes the step of generating a comparison report.

73. The method, as set forth in claim 52, wherein the report generating step includes the step of generating a forecast.

74. The method, as set forth in claim 52, wherein the report generating step included the step of generating a budget in traditional accounting information format.

* * * * *